(12) United States Patent
Fukushima et al.

(10) Patent No.: US 11,189,891 B2
(45) Date of Patent: Nov. 30, 2021

(54) ENERGY STORAGE APPARATUS, VEHICLE, AND MOTORCYCLE

(71) Applicant: GS Yuasa International Ltd., Kyoto (JP)

(72) Inventors: Atsushi Fukushima, Kyoto (JP); Yuki Imanaka, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 0 days.

(21) Appl. No.: 16/623,286

(22) PCT Filed: Jul. 3, 2018

(86) PCT No.: PCT/JP2018/025215
§ 371 (c)(1),
(2) Date: Dec. 16, 2019

(87) PCT Pub. No.: WO2019/009292
PCT Pub. Date: Jan. 10, 2019

(65) Prior Publication Data
US 2020/0106082 A1    Apr. 2, 2020

(30) Foreign Application Priority Data

Jul. 3, 2017 (JP) .............................. JP2017-130162

(51) Int. Cl.
*B60L 58/10* (2019.01)
*H02P 27/06* (2006.01)
(Continued)

(52) U.S. Cl.
CPC ............. *H01M 50/572* (2021.01); *B60L 3/04* (2013.01); *B60L 50/60* (2019.02); *B62J 99/00* (2013.01);
(Continued)

(58) Field of Classification Search
CPC .......................... B60L 2241/549; H02H 3/06
See application file for complete search history.

(56) References Cited

U.S. PATENT DOCUMENTS

2004/0109274 A1*  6/2004  Sato
2008/0158755 A1   7/2008  Sato
(Continued)

FOREIGN PATENT DOCUMENTS

JP    H09-200951 A    7/1997
JP    2002-272001 A   9/2002
(Continued)

OTHER PUBLICATIONS

International Search Report (ISR) (PCT Form PCT/ISA/210), in PCT/JP2018/025215, dated Sep. 25, 2018.

*Primary Examiner* — Kawing Chan
*Assistant Examiner* — Charles S Laughlin
(74) *Attorney, Agent, or Firm* — McGinn I.P. Law Group, PLLC.

(57) ABSTRACT

An energy storage apparatus includes: an external terminal connected to an energy storage device; a current cut-off device disposed on a current path connecting the energy storage device and the external terminal to each other; a voltage applying circuit that applies a voltage to the external terminal using the energy storage device or another circuit as a power source; and a control device. The control device is configured to perform: current cut-off processing for cutting off flowing of a current into the energy storage device by bringing the current cut-off device into an OPEN state; detecting processing for detecting a voltage of the external terminal to which a voltage is applied by the voltage applying circuit during a period in which the flowing of the current is cut off by the current cut-off processing; and determining processing for determining a presence or a non-presence of a short-circuiting object.

20 Claims, 23 Drawing Sheets

(51) Int. Cl.
      *H01M 50/572*     (2021.01)
      *B60L 50/60*       (2019.01)
      *B60L 3/04*        (2006.01)
      *B62J 99/00*      (2020.01)
      *H01M 10/42*     (2006.01)
      *H02J 7/00*       (2006.01)
      *B62J 45/00*      (2020.01)

(52) U.S. Cl.
      CPC ....... *H01M 10/4257* (2013.01); *H02J 7/0031* (2013.01); *B62J 45/00* (2020.02); *H01M 2010/4271* (2013.01); *H01M 2220/20* (2013.01)

(56) References Cited

U.S. PATENT DOCUMENTS

| | | | |
|---|---|---|---|
| 2015/0236501 A1* | 8/2015 | Lee | H02H 11/005 |
| | | | 361/57 |
| 2016/0336626 A1 | 11/2016 | Kawauchi et al. | |
| 2017/0059658 A1* | 3/2017 | Tanaka | G01R 31/40 |
| 2017/0113556 A1* | 4/2017 | Nakamura | B60K 7/0007 |

FOREIGN PATENT DOCUMENTS

| | | | |
|---|---|---|---|
| JP | 2004-227780 A | 8/2004 |
| JP | 2011-192646 A | 9/2011 |
| JP | 2013-145175 A | 7/2013 |
| JP | 2015-090745 A | 5/2015 |
| JP | 2017-005985 A | 1/2017 |

\* cited by examiner

Fig. 7

|  | Short-circuiting object being present | Short-circuiting object being not present |
|---|---|---|
| Voltage at point A | 0V | Ev |

Fig. 9

|  | Short-circuiting object being present | Short-circuiting object being not present |
|---|---|---|
| Voltage at point C | Ev | 0V |

Fig. 12

|  | Short-circuiting object being present | Short-circuiting object being not present |
|---|---|---|
| Voltage at point A | 0V | Ev × K |

ENERGY STORAGE APPARATUS, VEHICLE, AND MOTORCYCLE

TECHNICAL FIELD

The present invention relates to a technique for preventing a large current from flowing into an energy storage apparatus when a current cut-off device is switched from an OPEN state to a CLOSE state.

BACKGROUND ART

Regarding a battery for starting an engine of an automobile, there is a possibility that, during an operation of mounting the battery on the vehicle, a terminal is short-circuited due to a careless operation of an operator so that a large current flows. In recent years, lithium ion secondary batteries having a lower internal resistance than conventionally widely used lead-acid batteries have been increasingly used as batteries for starting engines, and thus it is considered that a value of a current, which flows when short-circuiting occurs, increases.

As disclosed in Patent Document 1 described below, a lithium ion secondary battery includes a current cut-off device such as a relay or an FET, and the current cut-off device cuts off a current when an external short-circuiting occurs.

PRIOR ART DOCUMENTS

Patent Documents

Patent Document 1: JP-A-2017-5985

SUMMARY OF THE INVENTION

Problems to be Solved by the Invention

In an energy storage apparatus, when an external terminal is short-circuited, a current can be cut off by bringing current cut-off device into an OPEN state. The energy storage apparatus in which a current is cut off due to short-circuiting of the external terminals may be reused later. When the current cut-off device is switched from an OPEN state to a CLOSE state in order to reuse the energy storage apparatus, a large current may flow if the external terminal remains in a short-circuited state. In addition to short-circuiting of the external terminal, there may be a case where a current is cut off in the energy storage apparatus depending on a state of a host system. For example, in a high-voltage battery for an electric vehicle, a current is cut off by bringing a current cut-off device into an OPEN state when the vehicle is not traveling. During traveling, the current cut-off is released so that the energy storage apparatus is electrically connected to a drive motor to supply a current to the drive motor. At the time of releasing current cut-off and electrically connecting an energy storage apparatus to a host system or at the time of reusing the energy storage apparatus such as at the time of starting traveling of an electric vehicle, there may be a case where an external terminal is short-circuited. In such a case, there is a possibility that a large current flows into the battery. To prevent the occurrence of such a state, it is preferable to bring the current cut-off device into a CLOSE state after detecting that the external terminal is not short-circuited.

The present invention has been made in view of the above circumstances, and it is an object of the present invention to prevent a large current from flowing into an energy storage apparatus when a current cut-off device is switched from an OPEN state to a CLOSE state.

Means for Solving the Problems

An energy storage apparatus includes: an energy storage device; an external terminal connected to the energy storage device; a current cut-off device disposed on a current path connecting the energy storage device and the external terminal to each other; a voltage applying circuit that applies a voltage to the external terminal using the energy storage device or another circuit as a power source; and a control device, wherein the control device is configured to perform: current cut-off processing for cutting off flowing of a current into the energy storage device by bringing the current cut-off device into an OPEN state; detecting processing for detecting a voltage of the external terminal to which a voltage is applied by the voltage applying circuit during a period in which the flowing of the electricity is cut off by the current cut-off processing; and determining processing for determining a presence or a non-presence of a short-circuiting object which causes short-circuiting between the external terminals based on a voltage of the external terminal detected in the detecting processing, and the control device is configured to perform switching processing for switching the current cut-off device to a CLOSE state only when it is determined that the short-circuiting object is not present in the determining processing.

Advantages of the Invention

The energy storage apparatus has a voltage applying circuit, and is capable of applying a voltage to the external terminal even if the current cut-off device is brought into an OPEN state. By applying a voltage to the external terminal by the voltage applying circuit and by detecting the voltage of the external terminal, it is possible to determine whether or not the external terminals are short-circuited by a short-circuiting object during a period in which flowing of an electric current is cut off. By switching the current cut-off device from an OPEN state to a CLOSE state only when it is determined that the external terminal is not short-circuited, it is possible to prevent a large current from flowing into the energy storage apparatus when the current cut-off device is switched to a CLOSE state.

BRIEF DESCRIPTION OF THE DRAWINGS

FIG. 7 is a chart that summarizes a voltage at a point A used for determining the presence or the non-presence of a short-circuiting object.

FIG. 9 is a chart summarizing the voltage at a point C for the presence or non-presence of short-circuiting object.

FIG. 12 is a chart summarizing a voltage at a point A used for determining the presence or the non-presence of a short-circuiting object.

MODE FOR CARRYING OUT THE INVENTION

Figure 1:
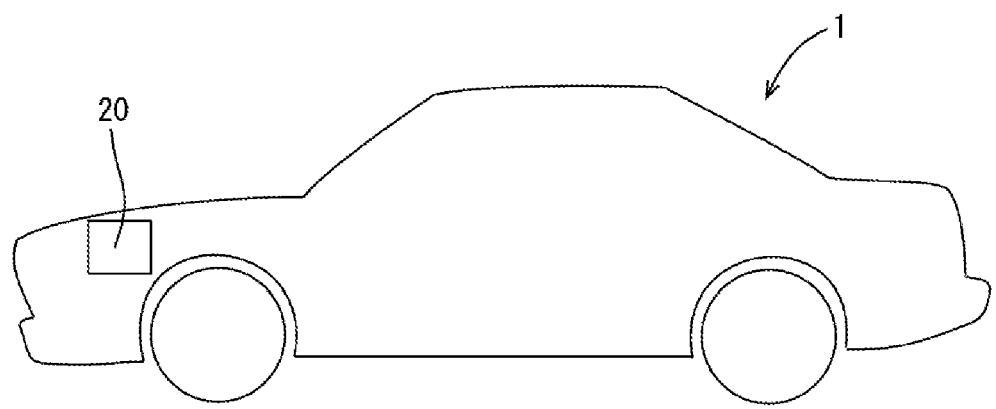
FIG. 1 is a side view of an automobile according to an embodiment 1.

An energy storage apparatus includes: an energy storage device; an external terminal connected to the energy storage device; a current cut-off device disposed on a current path connecting the energy storage device and the external terminal to each other; a voltage applying circuit that applies a voltage to the external terminal using the energy storage device or another circuit as a power source; and a control device, wherein the control device is configured to perform: current cut-off processing for cutting off flowing of a current into the energy storage device by bringing the current cut-off device into an OPEN state; detecting processing for detecting a voltage of the external terminal to which a voltage is applied by the voltage applying circuit during a period in which the flowing of the current is cut off by the current cut-off processing; and determining processing for determining a presence or a non-presence of a short-circuiting object which causes short-circuiting between the external terminals based on a voltage of the external terminal detected in the detecting processing, and the control device is configured to perform switching processing for switching the current cut-off device to a CLOSE state only when it is determined that the short-circuiting object is not present in the determining processing.

The energy storage apparatus has a voltage applying circuit. The voltage applying circuit can apply a voltage to the external terminal even if the current cut-off device is brought into an OPEN state. By applying a voltage to the external terminal by the voltage applying circuit and by detecting the voltage of the external terminal, it is possible to determine a presence or a non-presence of a short-circuiting object which causes short-circuiting between the external terminals during a period in which flowing of an electric current is cut off. The control device switches the current cut-off device from an OPEN state to a CLOSE state only when it is determined that a short-circuiting object is not present, it is possible to prevent a large current from flowing into the energy storage apparatus when the current cut-off device is switched to a CLOSE state.

The voltage applying circuit may be a circuit which connects the power source and the external terminal to each other, and the voltage applying circuit may include a current limiting element, and a switch connected in series to the current limiting resistor. With such a configuration, a current can be limited by the current limiting element and hence, it is possible to prevent a large current from flowing into the voltage applying circuit. When the switch is turned off, the voltage applying circuit can be deenergized and hence, the power consumption of the energy storage apparatus can be reduced.

The voltage applying circuit may be a circuit which connects the power source and the external terminal to each other, and the voltage applying circuit may include a capacitor, and a switch connected in series to the capacitor. With such a configuration, a current can be limited except for charging the capacitor and hence, it is possible to prevent a large current from flowing into the voltage applying circuit. When the switch is turned off, the voltage applying circuit can be deenergized and hence, the power consumption of the energy storage apparatus can be reduced.

The control device may perform the current cut-off processing when the external terminal is short-circuited. By cutting off the current when the external terminal is short-circuited and hence, a damage to the energy storage apparatus can be prevented whereby the safety of the energy storage apparatus is increased.

When the control device determines that a short-circuiting object is not present in the determining processing, the control device may decide whether or not to execute the switching processing based on information on a state of charge of the energy storage device. When the state of charge is not suitable for use of the energy storage apparatus, the use of the energy storage apparatus can be restricted.

The energy storage device may be a lithium ion secondary battery. Since a lithium ion secondary battery has a smaller internal resistance than a lead-acid battery, a large current flows into the battery when an external terminal is short-circuited. By applying the technique to the lithium ion secondary battery, it is possible to prevent a large current from flowing into the lithium ion secondary battery when the current cut-off device is switched from an OPEN state to a CLOSE state. Accordingly, the safety of the battery is increased.

This technique is applicable to a control method and control program for a current cut-off device.

Embodiment 1

1. Description of Battery

Figure 2:
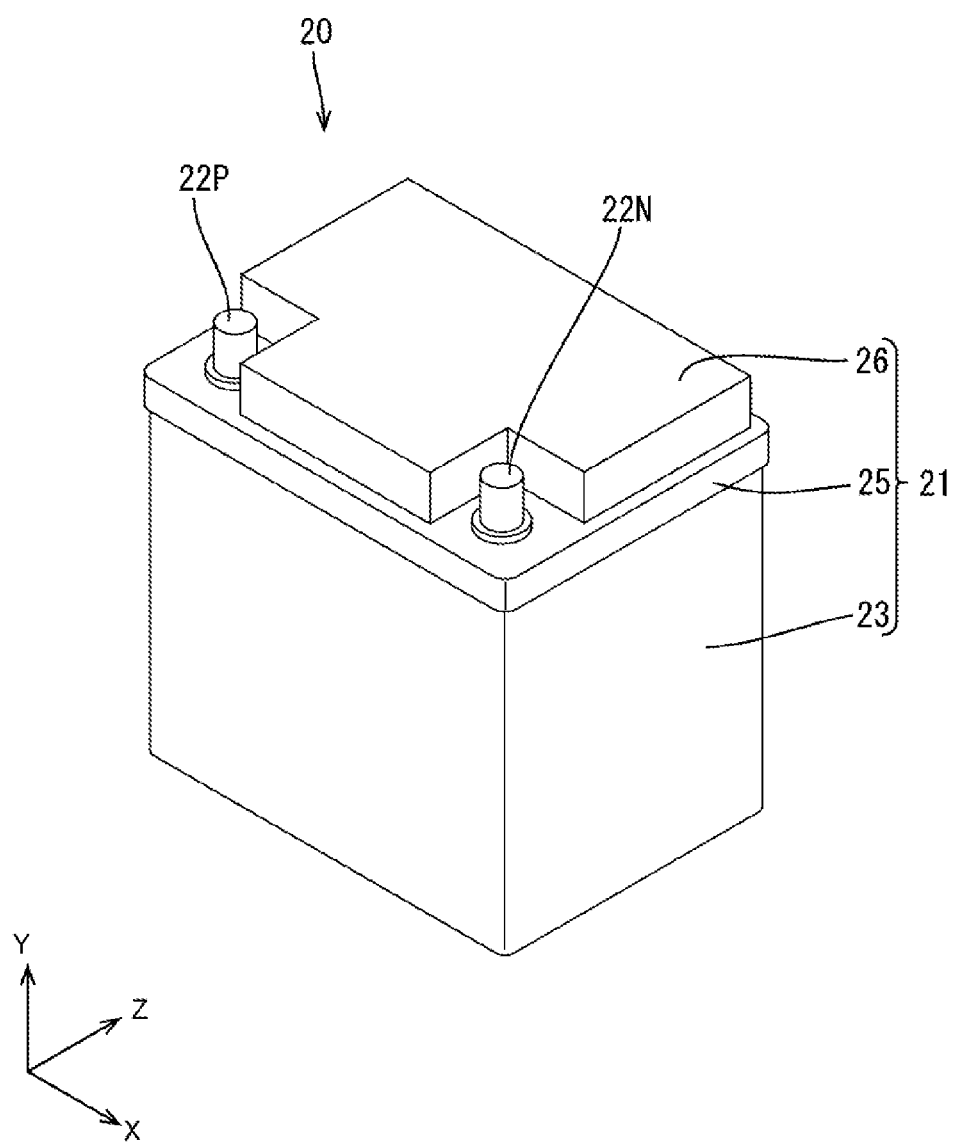
FIG. 2 is a perspective view of a battery.
Figure 3:
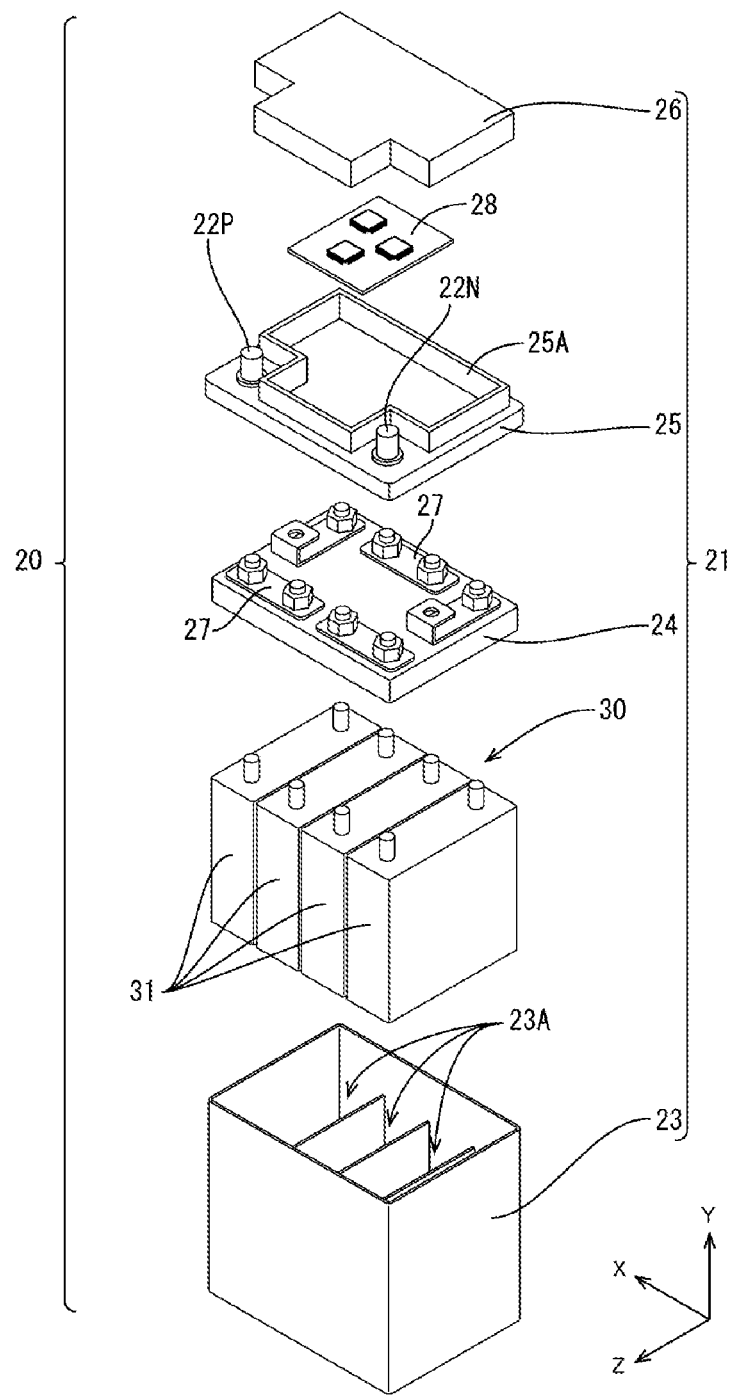
FIG. 3 is an exploded perspective view of the battery.
Figure 4:
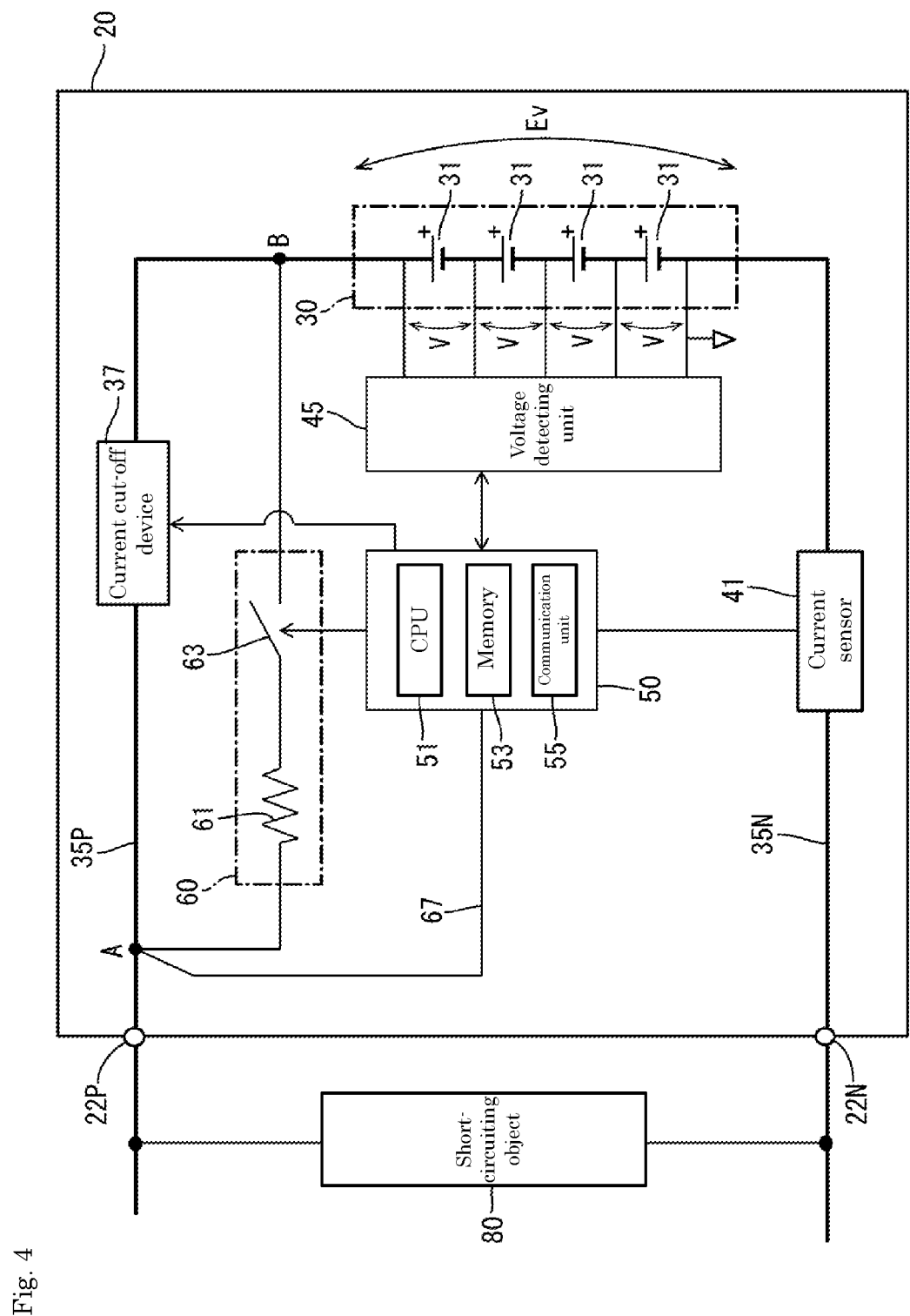
FIG. 4 is a block diagram showing an electrical configuration of the battery.

FIG. 1 is a side view of an automobile, FIG. 2 is a perspective view of a battery, FIG. 3 is an exploded perspective view of the battery, and FIG. 4 is a block diagram showing an electrical configuration of the battery. The automobile 1 is a four-wheeled automobile having an engine as a drive device.

As shown in FIG. 1, the automobile 1 includes a battery (corresponding to "energy storage apparatus") 20. As shown in FIG. 2, the battery 20 has a block-shaped battery case 21. An assembled battery 30 formed of a plurality of secondary batteries 31 and a control board 28 are accommodated in the battery case 21. In the description made hereinafter, when FIG. 2 and FIG. 3 are referred, the description is made by setting directions of the battery case 21 as follows. The vertical direction of the battery case 21 when the battery case 21 is placed horizontally without being inclined with respect to a mounting surface is set as a Y direction. A direction along a longitudinal direction of the battery case 21 is set as an X direction. A depth direction of the battery case 21 is set as a Z direction.

As shown in FIG. 3, the battery case 21 includes: a box-shaped case body 23 that opens upward; a positioning member 24 that positions a plurality of secondary batteries 31; and an inner lid 25 and an upper lid 26 that are mounted on an upper portion of the case body 23. In the case body 23, a plurality of cell chambers 23A in which the secondary batteries 31 are individually accommodated are disposed side by side in the X direction.

As shown in FIG. 3, a plurality of bus bars 27 are arranged on an upper surface of the positioning member 24. By arranging the positioning member 24 on upper portions of the plurality of secondary batteries 31 arranged in the case body 23, the plurality of secondary batteries 31 are positioned, and are connected in series by the plurality of bus bars 27.

The inner lid 25 has a substantially rectangular shape as viewed in a plan view. A pair of external terminals 22P and 22N are disposed on both end portions of the inner lid 25 in the X direction. The pair of external terminals 22P and 22N are made of metal such as a lead alloy, for example. The external terminal 22P is an external terminal on a positive electrode side and the external terminal 22N is an external terminal on a negative electrode side. A load such as a cell motor can be connected to the battery 20 via the external terminals 22P and 22N.

An accommodating portion 25A is formed on an upper surface of the inner lid 25. A control board 28 is accommodated in the accommodating portion 25A of the inner lid 25. The secondary battery 31 and the control board 28 are connected to each other by mounting the inner lid 25 on the case body 23. An upper lid 26 is mounted on an upper portion of the inner lid 25 and closes an upper surface of the accommodating portion 25A that accommodates the control board 28.

The electrical configuration of the battery 20 will be described with reference to FIG. 4. The battery 20 includes an assembled battery 30, a current cut-off device 37, a current sensor 41, a voltage detecting unit 45, a voltage applying circuit 60, and a control device 50 that controls the assembled battery 30.

The assembled battery 30 is formed of a plurality of secondary batteries (for example, four lithium ion secondary batteries) 31 which are connected in series. The lithium ion secondary battery 31 is an example of the "energy storage device". The external terminal 22P on the positive electrode side is connected to the positive electrode of the assembled battery 30 by a current path 35P on the positive electrode side. The external terminal 22N on the negative electrode side is connected to the negative electrode of the assembled battery 30 via a current path 35N on the negative electrode side. The current cut-off device 37 is disposed on the current path 35P on the positive electrode side. The current sensor 41 is disposed on the current path 35N on the negative electrode side. The assembled battery 30, the current sensor 41, and the current cut-off device 37 are connected in series via the current paths 35P and 35N.

A battery voltage of the lithium ion secondary battery 31 is about 3.5 [V], a total voltage Ev of the assembled battery 30 is about 14 V, and a voltage class of the battery 20 is 12 V. The battery 20 is provided for driving a cell motor that starts the engine of the automobile 1 (for starting the engine).

The current sensor 41 is disposed in the battery case 21, and detects a current flowing into the assembled battery 30. The current sensor 41 is electrically connected to the control device 50 through a signal line, and an output of the current sensor 41 is taken into the control device 50.

The voltage detecting unit 45 is disposed in the battery case 21, and detects voltages V of the respective secondary batteries 31 and a total voltage Ev of the assembled battery 30. The total voltage Ev of the assembled battery 20 is the total voltage (total voltage) of four secondary batteries 31. The voltage detecting unit 45 is electrically connected to the control device 50 via a signal line, and an output of the voltage detecting unit 45 is taken into the control device 50.

The current cut-off device 37 can be formed of a contact switch (mechanical) such as a relay or a semiconductor switch such as an FET or a transistor. The current cut-off device 37 is arranged on the current path 35P on the positive electrode side of the assembled battery 30, and opens and closes the current path 35P on the positive electrode side of the assembled battery 30.

A voltage applying circuit 60 is a circuit that applies a voltage to the external terminal 22P on the positive electrode side using the assembled battery 30 as a power source. The voltage applying circuit 60 includes a current limiting resistor 61 and a switch 63. The current limiting resistor 61 and the switch 63 are connected in series. The voltage applying circuit 60 connects between a point A positioned between the external terminal 22P on the positive electrode side and the current cut-off device 37 and a point B positioned between the current cut-off device 37 and the positive electrode of the assembled battery 30. The voltage applying circuit 60 is connected in parallel to the current cut-off device 37. The current limiting resistor 61 is an example of a "current limiting element".

When the switch 63 is turned on, the voltage applying circuit 60 is energized, and a voltage can be applied to the terminal portion 22P on the positive electrode side using the assembled battery 30 as a power source even when the current cut-off device 37 is in an OPEN state.

A resistance value of the current limiting resistor 61 is 100 kΩ, for example. It is preferable that the resistance value be preferably at least 1 kΩ or more. With such a configuration, when the switch 63 is turned on during a period in which two external terminals 22P and 22N are short-circuited to each other, it is possible to suppress a current flowing from the assembled battery 30 to the voltage applying circuit 60 to about 10 mA.

The switch 63 may be formed of a semiconductor switch such as an FET or a transistor. The switch 63 is always controlled to take an OFF state by the control device 50 except when a voltage at the point A is detected in a resetting control of the current cut-off device 37 shown in FIG. 6.

The control device 50 includes a CPU 51 having an arithmetic function, a memory 53 storing various information, a communication unit 55 and the like. The control device 50 is mounted on the control board 28. The communication unit 55 is provided for communication with a vehicle ECU (Electronic Control Unit) mounted on the automobile 1. After the communication unit 55 is mounted on the vehicle, the communication unit 55 is connected to the vehicle ECU via a signal line. Accordingly, the control device 50 can receive information about the automobile 1 such as an operation state of the engine from the vehicle ECU.

The control device 50 monitors a current of the assembled battery 30 based on an output of the current sensor 41. The control device 50 monitors battery voltages of the respective secondary batteries 31 and a total voltage Ev of the assembled battery 30 based on an output of the voltage detecting unit 45. The control device 50 is connected to the point A via the signal line 67, and can detect a voltage at the point A (a voltage at the terminal portion 22P on the positive electrode side). The control device 50 also performs a cut-off control and a resetting control of the current cut-off device 37 described below.

Figure 5:
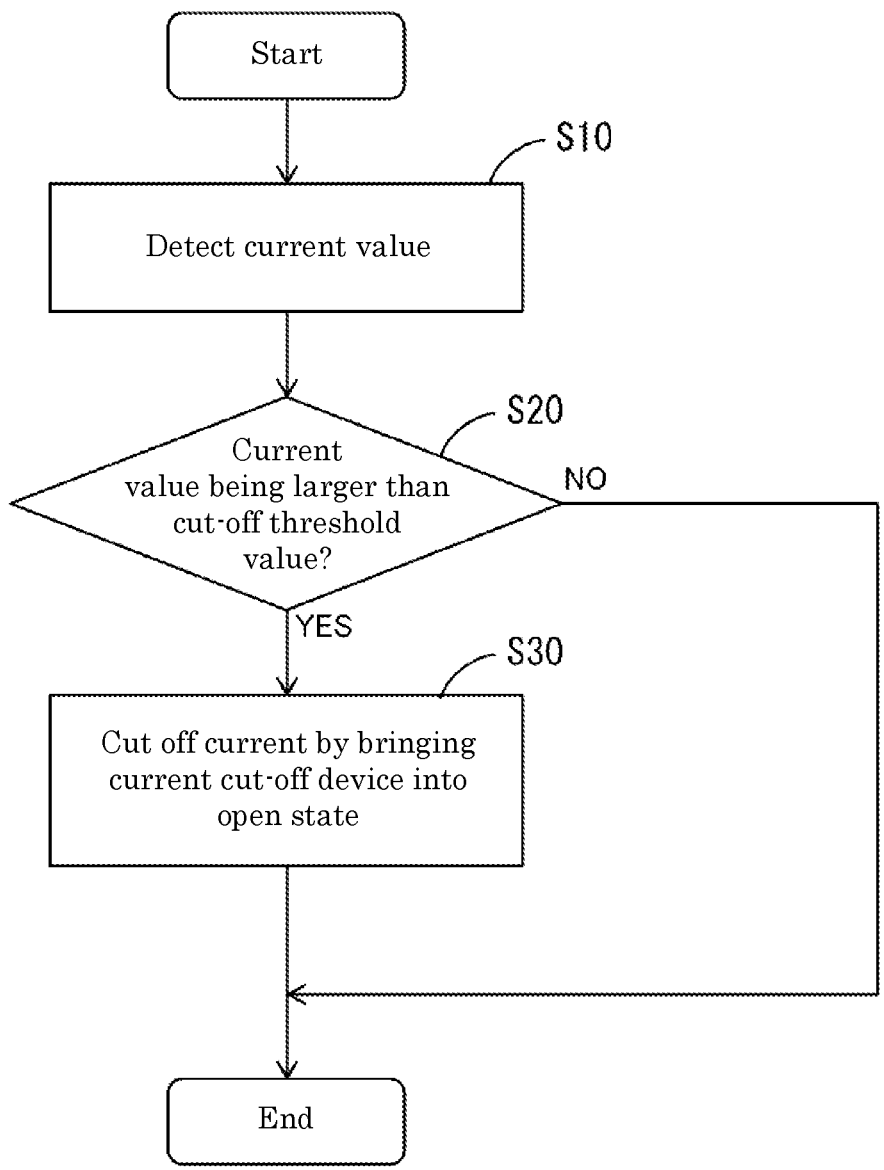
FIG. 5 is a flowchart showing a flow of a cut-off control of the current cut-off device.
Figure 6:
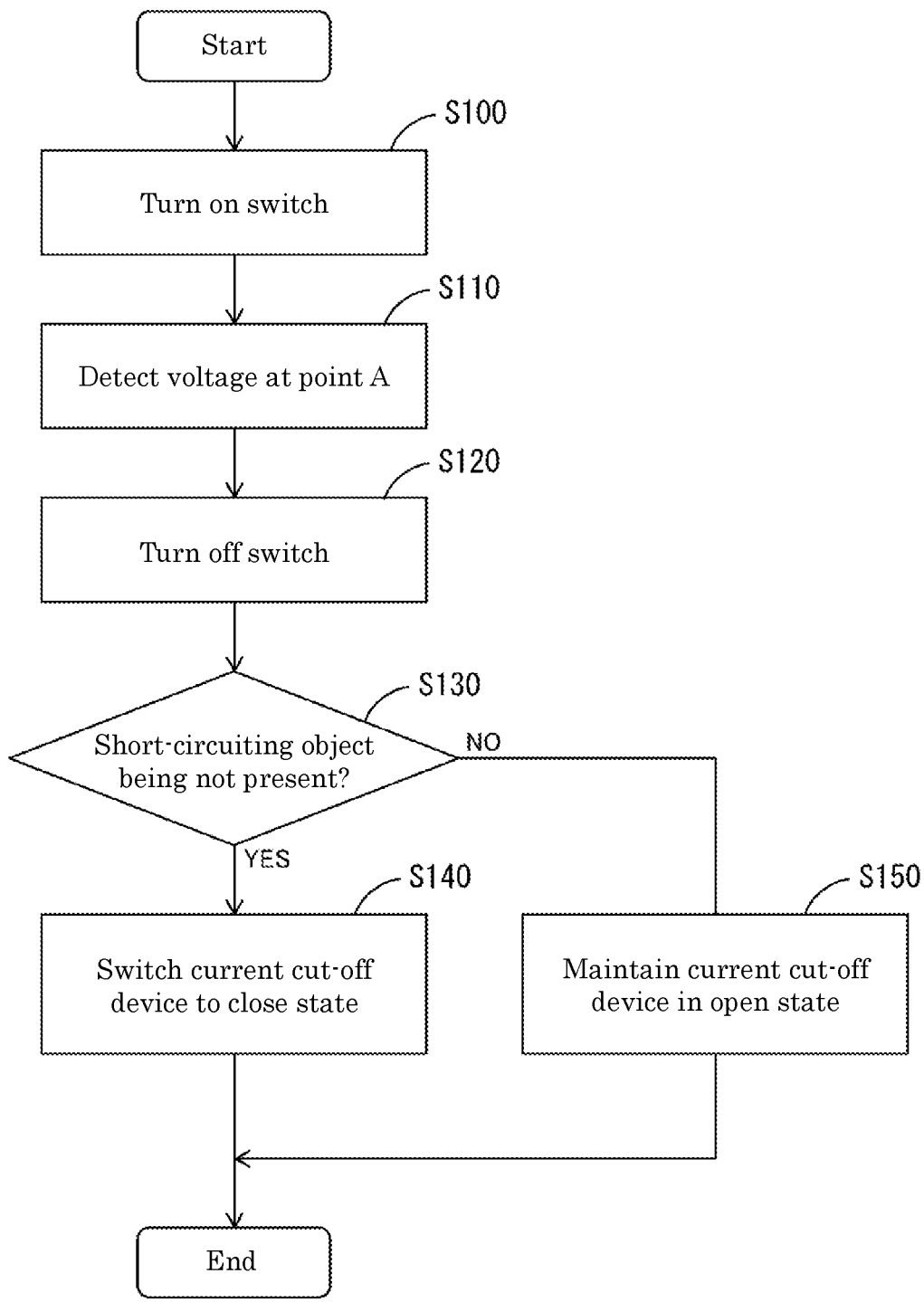
FIG. 6 is a flowchart showing a flow of a resetting control of the current cut-off device.

2. Cut-off control and resetting control of current cut-off device 37 FIG. 5 is a flowchart of the cut-off control of the current cut-off device 37. FIG. 6 is a flowchart of the resetting control of the current cut-off device 37.

The cut-off control and resetting control of the current cut-off device 37 will be described.

The cut-off control of the current cut-off device 37 is performed in accordance with steps S10 to S30 shown in FIG. 5. The current cut-off device 37 is normally in a CLOSE state. The control device 50 detects a current value I of the battery 20 from the current sensor 41 in step S10.

Next, the control device 50 compares the current value I with a cut-off threshold value in step S20. The cut-off threshold value is set to an intermediate value of a current flowing through the battery 20 when the external terminal is short-circuited and a current flowing through the battery 20 when the external terminal is not short-circuited.

When the current value I is equal to or less than the cut-off threshold value (step S20: NO), the control device 50 maintains the current cut-off device 37 in a CLOSE state.

When the current value I is larger than the cut-off threshold value (step S20: YES), the control device 50 sends an OPEN command to the current cut-off device 37. As a result, the current cut-off device 37 is brought into an OPEN state. Step S20 corresponds to "current cut-off processing".

When the battery 20 is not mounted on the vehicle and forms a single unit, the control device 50 repeatedly executes a cut-off control at a predetermined cycle. Therefore, in an operation of mounting the battery 20 which forms a single body on the automobile 1, when the external terminal 22P on the positive electrode side and the external terminal 22N on the negative electrode side are short-circuited to each other by a short-circuiting object 80 such as a tool, the current cut-off device 37 is brought into an OPEN state so that a current is cut off. By cutting off the current, a damage to the battery 20 can be prevented so that safety of the battery 20 is ensured.

Whether the battery 20 is in a vehicle mounted state or in a vehicle non-mounted state can be determined based on a state whether communication of the battery 20 with the vehicle ECU has been completed through the communication unit 55. Whether or not a load is not yet connected to the battery 20 can be determined based on a current value of the battery 20.

Next, the resetting control of the current cut-off device 37 will be described. The resetting control of the current cut-off device 37 is executed during a period in which the current cut-off device 37 is in an OPEN state.

As shown in FIG. 6, the resetting control of the current cut-off device 37 is performed in accordance with steps S100 to S150. The control device 50 turns on the switch 63 of the voltage applying circuit 60 in step S100. As a result, a voltage is applied to the external terminal 22P on the positive electrode side by the voltage applying circuit 60 using the assembled battery 30 as a power source.

Next, the control device 50 detects a voltage at the point A in step S110, and turns off the switch 63 in step S120. The switch 63 is always controlled to be in an OFF state except when the voltage at the point A is detected. Step S110 corresponds to "detecting processing".

Then, in step S130, the control device 50 determines the presence or non-presence of the short-circuiting object 80 based on the voltage at the point A. Specifically, when the external terminal 22P on the positive electrode side and the external terminal 22N on the negative electrode side are short-circuited to each other by the short-circuiting object 80, the voltage at the point A becomes 0V. On the other hand, when the external terminal 22P on the positive electrode side and the external terminal 22N on the negative electrode side are not short-circuited to each other, the voltage at the point A becomes a total voltage Ev of the assembled battery 30 (14V in this example).

The control device 50 compares a voltage at the point A with a threshold value (for example, Ev/2=7V), and determines that a short-circuiting object is not present when the voltage at the point A is greater than the threshold value (S130: YES).

When the control device 50 determines that a short-circuiting object is not present, the control device 50 sends a command to the current cut-off device 37 in step S140, and switches the current cut-off device 37 from an OPEN state to a CLOSE state. Step S130 corresponds to "determining processing", and step S140 corresponds to "switching processing".

On the other hand, when a voltage at the point A is equal to or less than the threshold value, the control device 50 determines that a short-circuiting object is present (step S130: NO). When the control device 50 determines that a short-circuiting object is present, the current cut-off device 37 is maintained in an OPEN state (step S150). By holding the current cut-off device 37 in an OPEN state, it is possible to prevent a large current from flowing into the battery 20.

The resetting control of the current cut-off device 37 in S100 to S150 is repeatedly executed at a predetermined cycle during a period in which the current cut-off device 37 is in an OPEN state.

Accordingly, in an operation of mounting the battery 20 on the automobile 1, after the external terminal 22P on the positive electrode side and the external terminal 22N on the negative electrode side are short-circuited by the short-circuiting object 80 such as a tool so that the current cut-off device 37 is brought into an OPEN state, when an operator removes the short-circuiting object 80, the current cut-off device 37 automatically returns to a CLOSE state. Accordingly, the battery 20 can be reused even when the operator does not perform a special operation of resetting to bring the current cut-off device 37 into a CLOSE state.

4. Description of Advantageous Effects

The battery 20 has a higher energy density per unit volume than other power sources have. When the energy density is high, a large current flows when the external terminal 22P on the positive electrode side and the external terminal 22N on the negative electrode side are short-circuited. Accordingly, the current cut-off device 37 is an indispensable component. In an operation of mounting the battery 20 on a vehicle, when the external terminal 22P on the positive electrode side and the external terminal 22N on the negative electrode side are short-circuited by the short-circuiting object 80 such as a tool, the control device 50 brings the current cut-off device 37 into an OPEN state. Accordingly, it is possible to prevent a damage to the battery 20 and hence, safety of the battery 20 can be ensured. In particular, since the lithium ion secondary battery 31 has a smaller internal resistance than a lead-acid battery, a large current flows when the external terminal 22P on the positive electrode side and the external terminal 22N on the negative electrode side are short-circuited to each other. By applying the technique to the lithium ion secondary battery 31, it is possible to cut off a current that flows when the external terminal 22P on the positive electrode side and the external terminal 22N on the negative electrode side are short-circuited. Accordingly, safety of the battery 20 can be improved.

The battery 20 has the voltage applying circuit 60. The battery 20 can apply a voltage to the external terminal 22P on the positive electrode side even when the current cut-off device 37 is in an OPEN state. By applying a voltage to the external terminal 22P on the positive electrode side and by detecting the voltage of the external terminal 22P on the positive electrode side, it is possible to determine the presence or non-presence of a short-circuiting object that caused short-circuiting between two external terminals 22P and 22N during a period in which a current is cut off. Only when the control device 50 determines that a short-circuiting object is not present, the control device 50 can prevent a large current from flowing into the battery 20 when the current cut-off device 37 is switched from an OPEN state to a CLOSE state by switching the current cut-off device 37 from an OPEN state to a CLOSE state.

The voltage applying circuit 60 includes a current limiting resistor 61 and a switch 63. By providing the current limiting resistor 61 to the voltage applying circuit 60, it is possible to prevent a large current from flowing into the voltage applying circuit 60 when the switch 63 is turned on in a state where the external terminals 22P and 22N are short-circuited to each other. Specifically, a resistance value of the current limiting resistor 61 is set to 100 kΩ and hence, a current flowing into the voltage applying circuit 60 can be suppressed to 1 mA or less. The control device 50 always controls the switch 63 to be in an OFF state except when a voltage at the point A is detected (S110). Accordingly, the voltage applying circuit 60 is de-energized except during a period in which a voltage at the point A is detected and hence, the power consumption of the battery 20 can be reduced.

Embodiment 2

Figure 8:
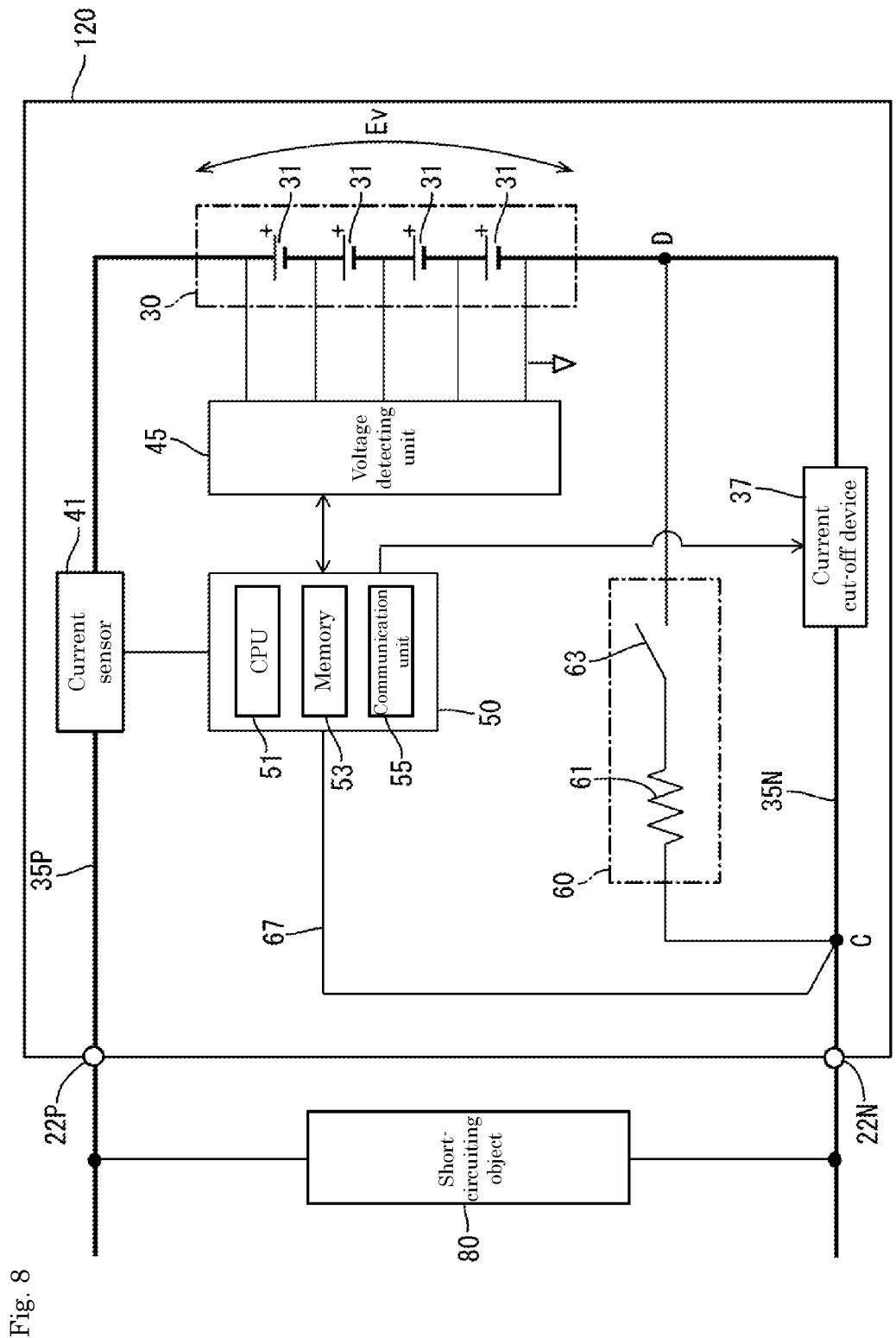
FIG. 8 is a block diagram showing an electrical configuration of a battery according to an embodiment 2.

As shown in FIG. 8, a battery 120 of the embodiment 2 differs from the battery 20 of the embodiment 1 in that a current sensor 41 is disposed on a current path 35P on the positive electrode side and a current cut-off device 37 is disposed on a current path 35N on the negative electrode side. A voltage applying circuit 60 is connected in parallel to a current cut-off device 37. The voltage applying circuit 60 connects between an external terminal 22N on the negative electrode side and a negative electrode of an assembled battery 30. The voltage applying circuit 60 connects between a point C positioned between the external terminal 22N on the negative electrode side and the current cut-off device 37 and a point D positioned between the current cut-off device 37 and the negative electrode of the assembled battery 30. In the battery 120 shown in FIG. 8, by turning on a switch 63 of the voltage applying device 60, a voltage can be applied to the external terminal 22N on the negative electrode side by using the assembled battery 30 as a power source.

Similarly as the embodiment 1, a control device 50 performs a resetting control of the current cut-off device 37 during a period in which the current cut-off device 37 is in an OPEN state. In the resetting control of the current cut-off device 37, the control device 50 turns on the switch 63 of the voltage applying device 60 so that the voltage applying device 60 applies a voltage to the external terminal 22N on the negative electrode side using the assembled battery 30 as a power source. The control device 50 detects a voltage at the point C (a voltage at the external terminal 22N on the negative electrode side), and the control device 50 determines the presence or the non-presence of a short-circuiting object 80 based on the detected voltage at the point C (the voltage at the external terminal 22N on the negative electrode side). Specifically, when an external terminal 22P on the positive electrode side and the external terminal 22N on the negative electrode side are short-circuited by the short-circuiting object 80 (the short-circuiting object being present), the voltage at the point C becomes a total voltage Ev of the assembled battery 30 (14V in this example). On the other hand, when the external terminal 22P on the positive electrode side and the external terminal 22N on the negative electrode side are not short-circuited to each other (a short-circuiting object not being present), the voltage at the point C becomes 0V.

The control device 50 compares the voltage at the point C with a threshold value (for example, Ev/2=7V), and determines that a short-circuiting object is present when the voltage at the point C is larger than the threshold value. The control device 50 determines that a short-circuiting object is not present when the voltage at the point C is equal to or less than the threshold value.

When the control device 50 determines that a short-circuiting object is not present, the control device 50 sends a command to the current cut-off device 37 as in the case of the embodiment 1, and switches the current cut-off device 37 from an OPEN state to a CLOSE state. Therefore, when the short-circuiting object 80 is removed, the battery 120 can be reused thereafter.

Embodiment 3

Figure 10:
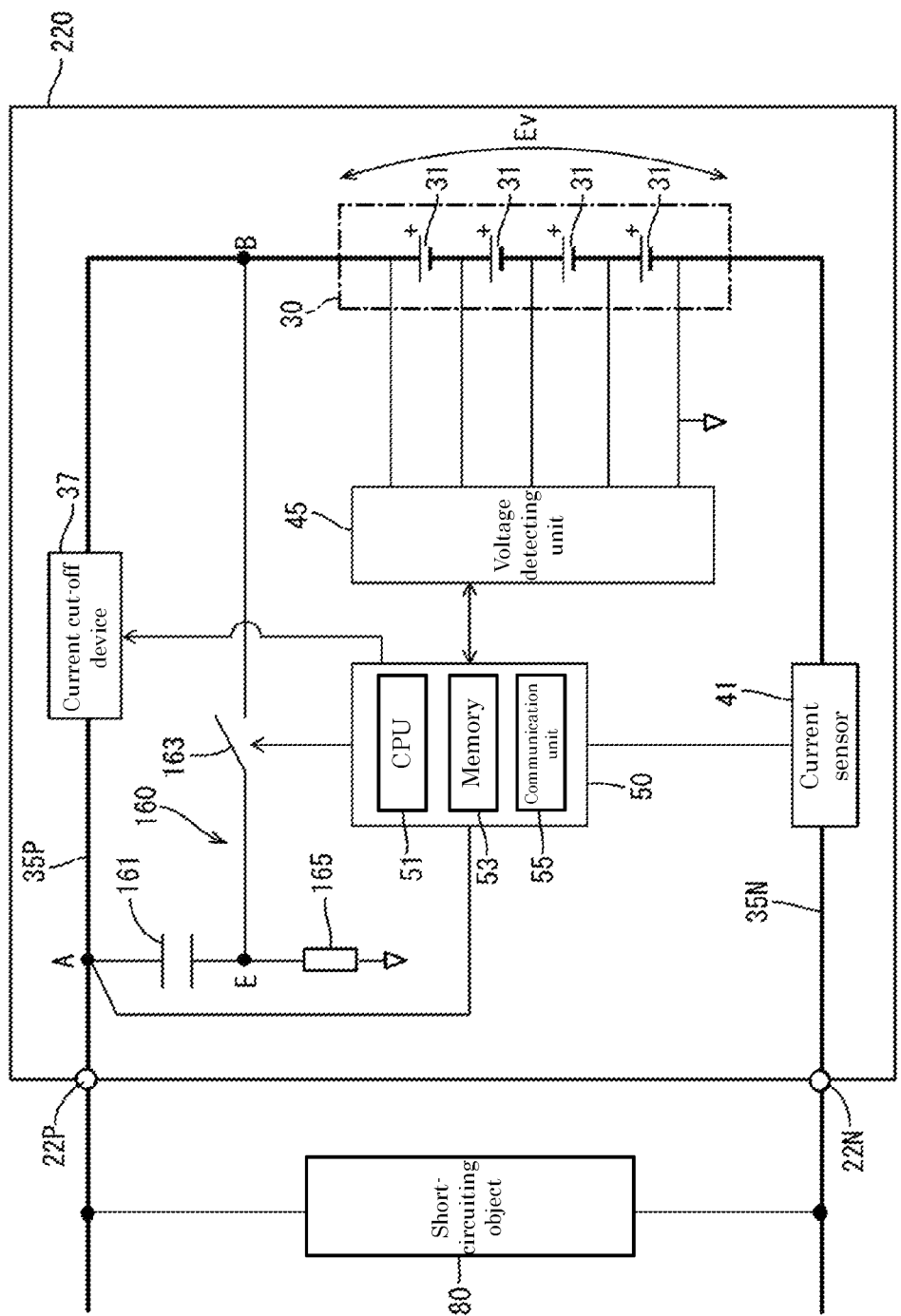
FIG. 10 is a block diagram showing an electrical configuration of a battery according to an embodiment 3.

As shown in FIG. 10, a battery 220 of the embodiment 3 differs from the battery 20 of the embodiment 1 with respect to a voltage applying circuit 160. The voltage applying circuit 160 is connected in parallel to a current cut-off device 37. The voltage applying circuit 160 includes a capacitor 161, a switch 163 and a discharge resistor 165.

The capacitor 161 and the switch 163 are connected in series, the capacitor is connected to a point A, and the switch 163 is connected to a point B. The discharge resistor 165 has one end connected to the intermediate connection point E between the capacitor 161 and the switch 163, and the other end connected to the ground. The discharge resistor 165 performs a function of discharging an electric charge charged in the capacitor 161 when the switch 163 is turned off by turning on the switch 163 when external terminal portions are short-circuited to each other by a short-circuiting object.

In the battery 220 shown in FIG. 10, by turning on the switch 163 of the voltage applying device 160, a voltage can be applied to an external terminal 22P on the positive electrode side using an assembled battery 30 as a power source.

Similarly as the embodiment 1, a control device 50 performs a resetting control of a current cut-off device during a period in which the current cut-off device 37 is in a CLOSE state. In the resetting control, the control device 50 applies a voltage to the external terminal 22P on the positive electrode side by using the assembled battery 30 as a power source by turning on the switch 163 of the voltage applying device 160. Then, the control device 50 detects a voltage at a point A (a voltage at the external terminal 22P on the positive electrode side), and determines the presence or the non-presence of a short-circuiting object 80 based on the detected voltage at the point A (the voltage at the external terminal 22P on the positive electrode side). Specifically, when the external terminal 22P on the positive electrode side and an external terminal 22N on the negative electrode side are short-circuited by the short-circuiting object 80 (the short-circuiting object being present), a voltage at the point A becomes 0V. On the other hand, when the external terminal 22P on the positive electrode side and the external terminal 22N on the negative electrode side are not short-circuited (short-circuiting object being not present), the voltage at the point A becomes a total voltage Ev of the assembled battery 30 (14V in this example).

The control device 50 compares the voltage at the point A with a threshold value (for example, Ev/2=7V), and determines that a short-circuiting object is not present when the voltage at the point A is larger than the threshold value. When the voltage at the point A is equal to or less than the threshold value, it is determined that a short-circuiting object is present.

When the control device 50 determines that a short-circuiting object is not present, the control device 50 sends a command to the current cut-off device 37 as in the case of the embodiment 1, and switches the current cut-off device 37 from an OPEN state to a CLOSE state. Therefore, when the short-circuiting object 80 is removed, the battery 220 can be reused thereafter.

Embodiment 4

Figure 11:
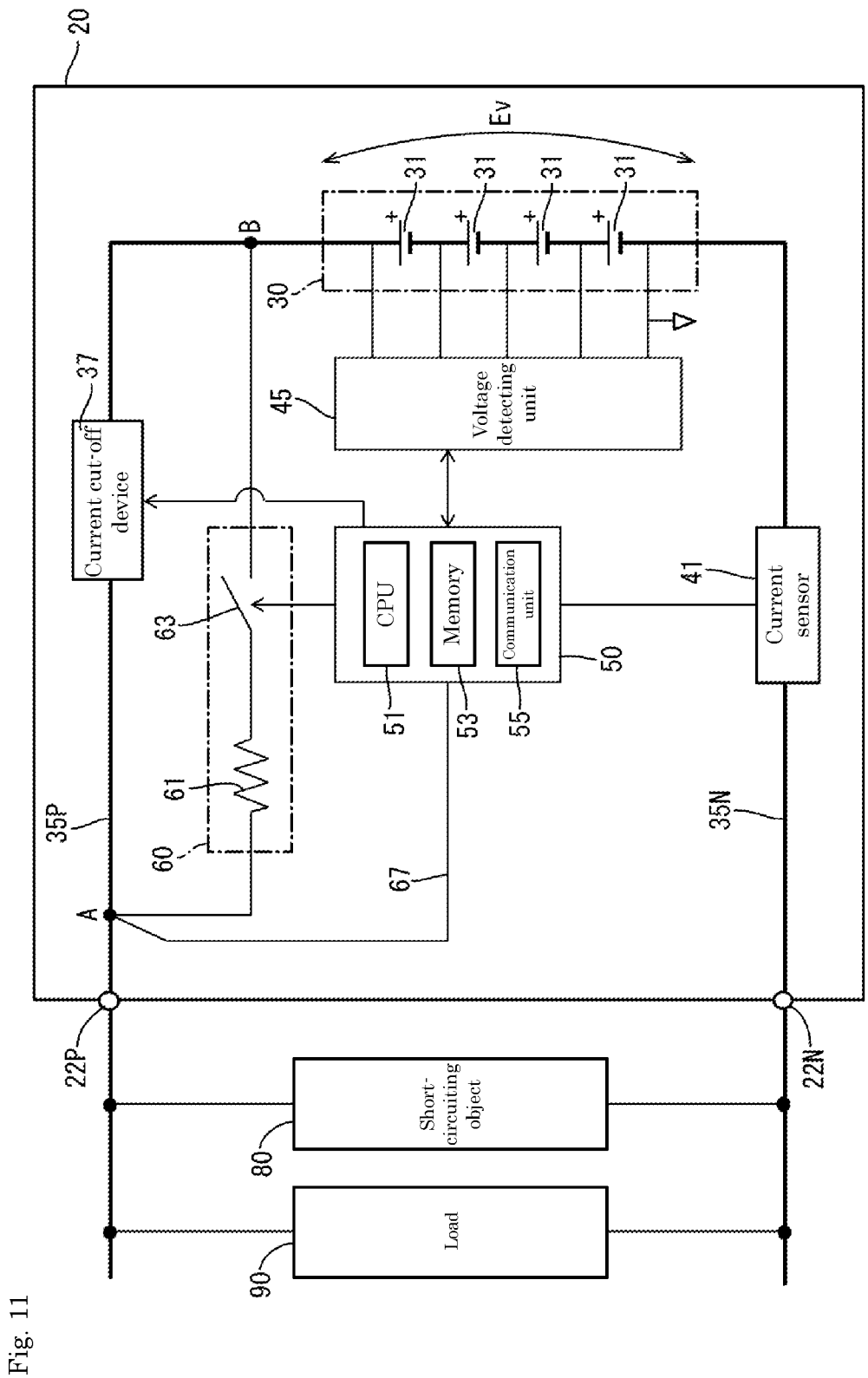
FIG. 11 is a block diagram showing an electrical configuration of a battery when a load is connected according to an embodiment 4.

In the embodiment 1, the cut-off control of the current cut-off device 37 is executed by taking as an example the case where the battery 20 is not mounted on a vehicle and a load is not connected to the battery 20. The cut-off control of the current cut-off device 37 may be performed in a state where the battery 20 is mounted on the vehicle and a load 90 is connected to the battery 20 as shown in FIG. 11. The resetting control of the current cut-off device 37 may be performed in a state where the battery 20 is mounted on the vehicle and the load is connected to the battery 20 as long as the current cut-off device 37 is in an OPEN state. In a state where the battery 20 is mounted on the vehicle and the load 90 is connected to the battery 20, when the switch 61 of the voltage applying circuit 60 is turned on during a period in which the current cut-off device 37 is in an OPEN state, as shown in FIG. 12, a voltage at the point A becomes 0V when a short-circuiting object 80 is present. On the other hand, when the short-circuiting object 80 is not present 80, a voltage at the point A becomes a voltage obtained by multiplying a total voltage Ev of the assembled battery 30 by a voltage dividing ratio K. Therefore, for example, assuming a threshold value as (Ev×K)/2, it can be determined that a short-circuiting object is not present when a voltage at the point A is greater than the threshold value, and it can be determined that a short-circuiting object is present when the voltage at the point A is equal to or less than the threshold value. The voltage dividing ratio K is a resistance ratio between the load 90 connected to the battery 20 and the resistor 61 of the voltage applying circuit 60.

Embodiment 5

Figure 13:
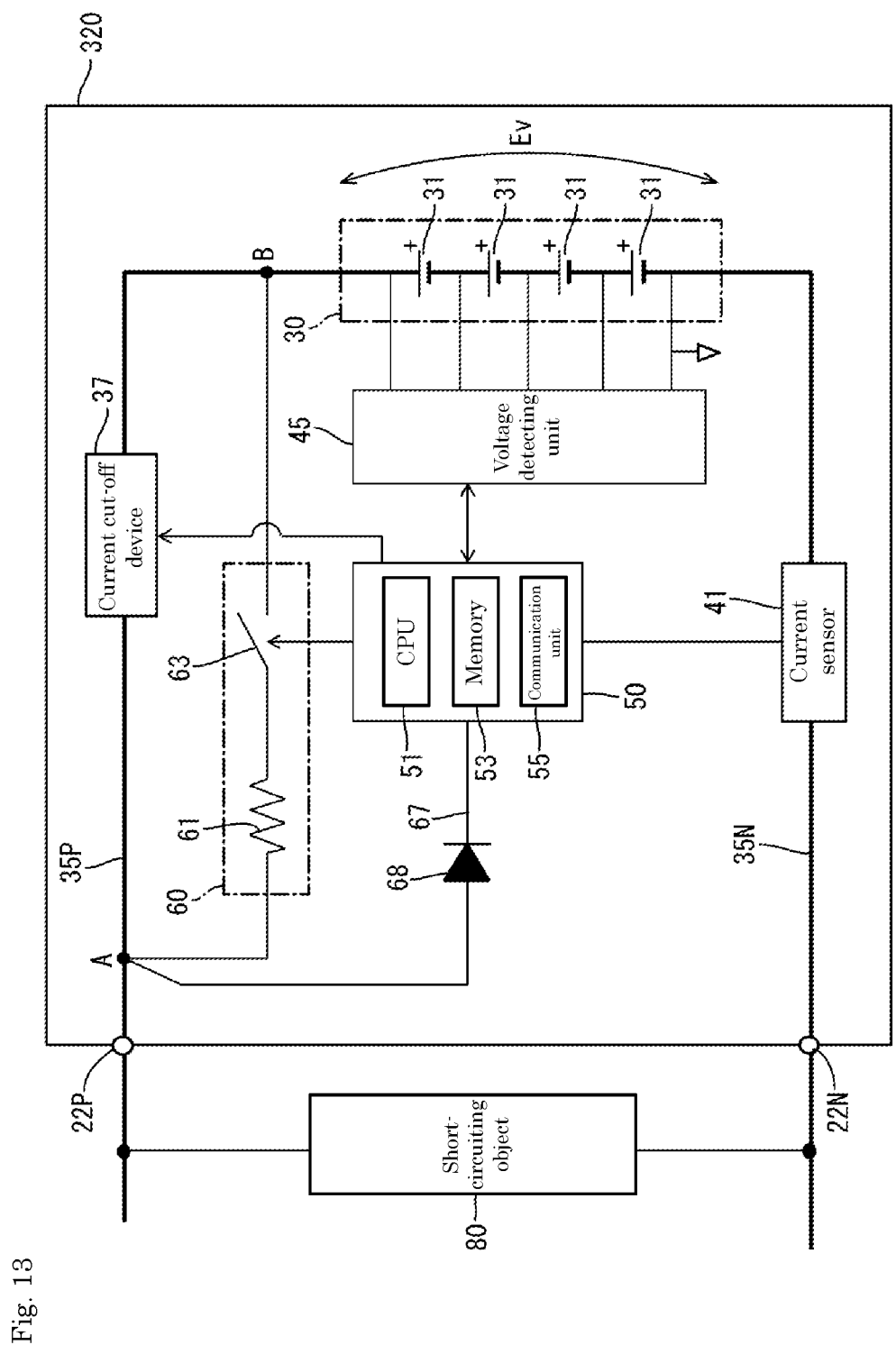
FIG. 13 is a block diagram showing the electrical configuration of the battery in an embodiment 5.

In the embodiment 1, the configuration is exemplified where the point A and the control device 50 are connected to each other by the signal line 67 and a voltage at the point A is directly inputted to the control device 50. As in the case of the battery 320 shown in FIG. 13, a diode 68 may be disposed on a signal line 67, and a voltage obtained by stepping down a voltage at a point A by a diode 68 may be inputted to the control device 50. Lowering of an input voltage is effective for protecting the control device 50.

Embodiment 6

Figure 14:
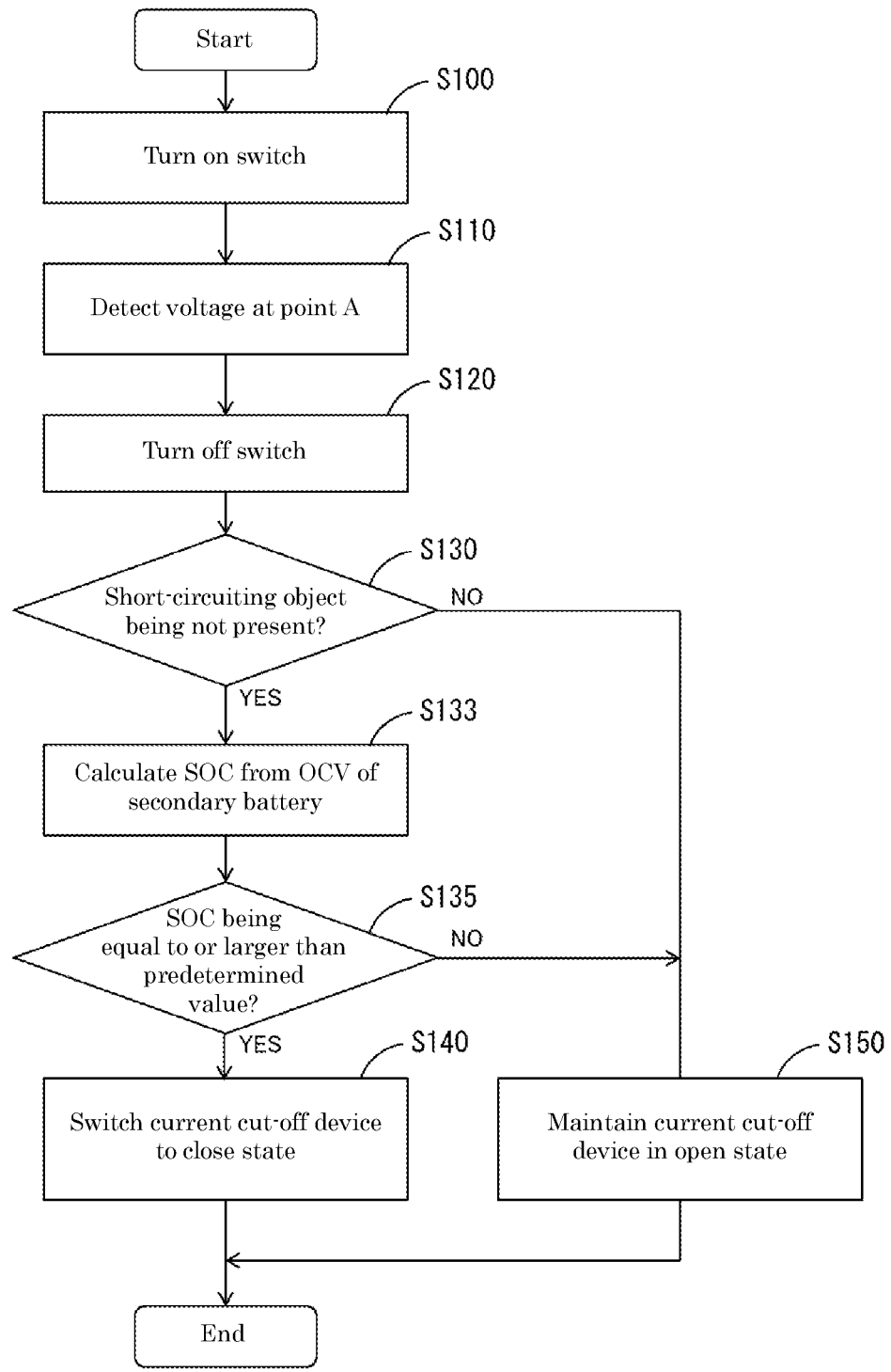
FIG. 14 is a flowchart of a resetting control according to an embodiment 6.

In the embodiment 1, when two external terminals 22P and 22N are short-circuited, the current cut-off device 37 is brought into an OPEN state thus cutting off a current. The control device 50 monitors a state of the battery 20 based on an output of the current sensor 41 and an output of the current detection unit 45, and the control device 50 brings the current cut-off device 37 into an OPEN state thus cutting off a current when an abnormality is detected in the battery 20. The abnormality of the battery 20 includes overdischarge and overcharge. FIG. 14 is a flowchart of a resetting control according to the embodiment 6. In the resetting control of the embodiment 6, two steps, that is, step S133 and step S135 are added to the resetting control of the embodiment 1 (steps S100 to S150 in FIG. 6). In steps S100 to S130, similarly as the embodiment 1, the control device 50 applies a voltage to the external terminal 22P on the positive electrode side using the voltage applying circuit 60, and detects a voltage at the point A. The control device 50 determines whether two external terminals 22P and 22N are short-circuited by the short-circuiting object 80 by comparing the voltage at a point A with a threshold value. When the control device 50 determines that two external terminals 22P and 22N are not short-circuited by the short-circuiting object 80 (S130: YES), the control device 50 calculates an SOC from an OCV of the secondary battery 31 (S133).

SOC (state of charge) is a ratio of a residual capacity to a full charge capacity of the secondary battery 31 and is expressed by the following equation (1).

$$SOC = Cr/Co \times 100 \tag{1}$$

In the equation (1), Co is the full charge capacity of the secondary battery, and Cr is the residual capacity of the secondary battery.

Figure 15:
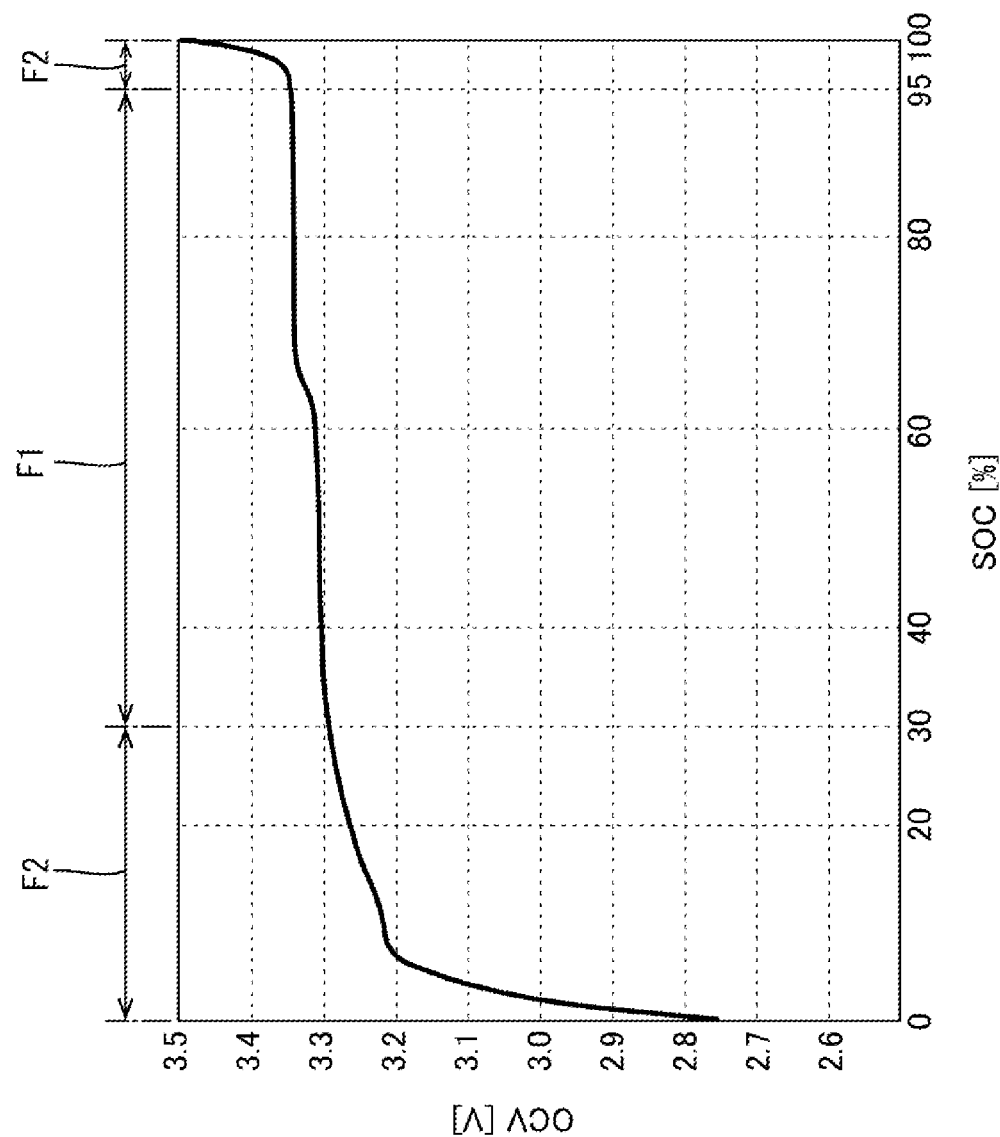
FIG. 15 is a SOC-OCV correlation graph.

FIG. 15 is an SOC-OCV correlation graph where an SOC of the secondary battery 31 is taken on an axis of abscissas and OCV of the secondary battery 31 is taken on an axis of ordinates. OCV (Open Circuit Voltage) is a voltage V of the secondary battery 31 in a state where there is no current or in a state where it is regarded that there is no current. The state where it is regarded that there is no current is a state in which a current value is equal to or less than a threshold value. As shown in FIG. 15, OCV and SOC are correlated. The OCV-SOC correlation graph has a plurality of regions where amounts in change of OCV differ from each other. A range where an amount of SOC is 30 to 95% is a flat low change region F1 in which a change amount of OCV with respect to a change amount of SOC is smaller than a predetermined reference value. A range where the amount of SOC is 95% or more and a range where the amount of the SOC is 30% or less is high change regions F2 where the change amount of the OCV with respect to the change amount of the SOC is higher than the reference value.

The control device 50 calculates a SOC of the secondary battery 31 in correlation with the OCV measured by the voltage detecting unit 45 by looking up the correlation graph shown in FIG. 15.

After calculating the SOC of the secondary battery 31, the control device 50 compares the calculated SOC with a predetermined value (S135). The predetermined value is a value for determining whether or not the battery 20 is overdischarged, and is 20% as an example.

When the SOC of the secondary battery 31 is equal to or larger than the predetermined value (S135: YES), the control device 50 determines that the battery 20 is not overdischarged and switches the current cut-off device 37 from an OPEN state to a CLOSE state (S140). On the other hand, when the SOC of the secondary battery 31 is less than the predetermined value (S135: NO), the control device 50 determines that the battery 20 is overdischarged and maintains the current cut-off device 37 in an OPEN state (S150).

When it is determined that the battery 20 is overdischarged, the control device 50 maintains the current cut-off device 37 in an OPEN state. Accordingly, it is possible to prevent the overdischarged battery 20 from being reused.

Embodiment 7

Figure 16:
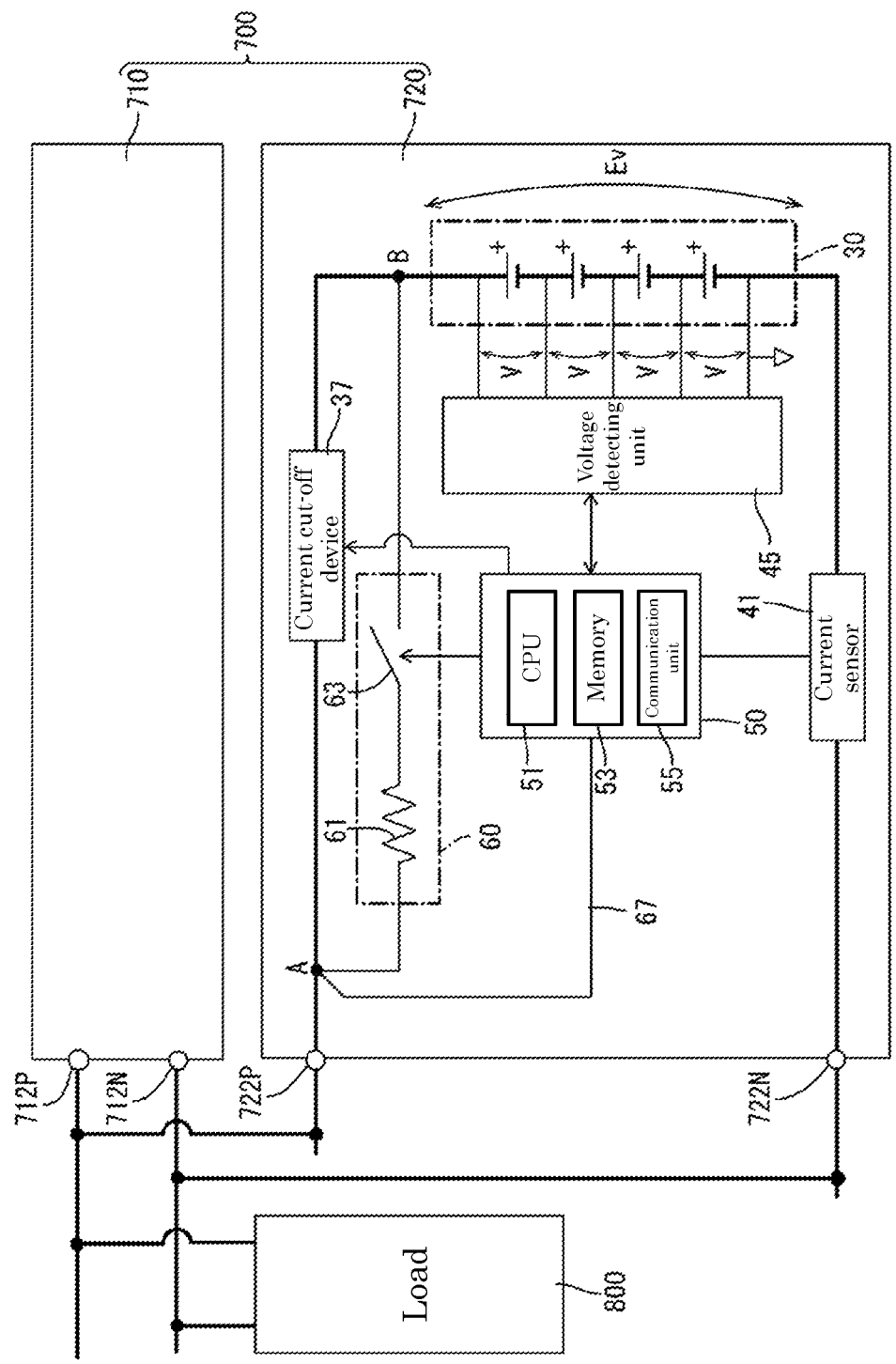
FIG. 16 is a block diagram of a power supply system according to an embodiment 7.

FIG. 16 is a block diagram of a power supply system 700. The power supply system 700 includes a main battery 710 and a sub battery 720. The main battery 710 includes an external terminal 712P on the positive electrode side and an external terminal 712N on the negative electrode side. A load 800 is connected to the main battery 710 via the external terminal 712P on the positive electrode side and the external terminal 712N on the negative electrode side.

The sub battery 720 includes an external terminal 722P on the positive electrode side and an external terminal 722N on the negative electrode side. The external terminal 722P on the positive electrode side and the external terminal 722N on the negative electrode side are connected to the external terminal 712P on the positive electrode side and the external terminal 712N on the negative electrode side of the main battery 710 respectively, and the sub battery 720 is connected in parallel to the main battery 710. By connecting the sub battery 720 to the main battery 710 in parallel, even when power cannot be supplied from the main battery 710 to the load 800, power can be supplied from the sub battery 720. Accordingly, redundancy of the power supply system 700 is increased.

Similarly as the battery 20 of the embodiment 1, the sub battery 720 includes an assembled battery 30, a current cut-off device 37, a current sensor 41, a voltage detecting unit 45, a voltage applying circuit 60, and a control device 50 that controls the assembled battery 30.

When two external terminals 722P and 722N are short-circuited to each other, the control device 50 brings the current cut-off device 37 into an OPEN state and cuts off a current. The control device 50 executes a resetting control shown in FIG. 6 during a period in which the current cut-off device 37 is in an OPEN state, and switches the current cut-off device 37 from an OPEN state to a CLOSE state when a short-circuiting object is removed. Therefore, after the removal of the short-circuiting object, the sub battery 720 becomes reusable and an unusable period of the power supply system 700 is shortened so that the redundancy of the power supply system 700 can be increased.

Embodiment 8

Figure 17:
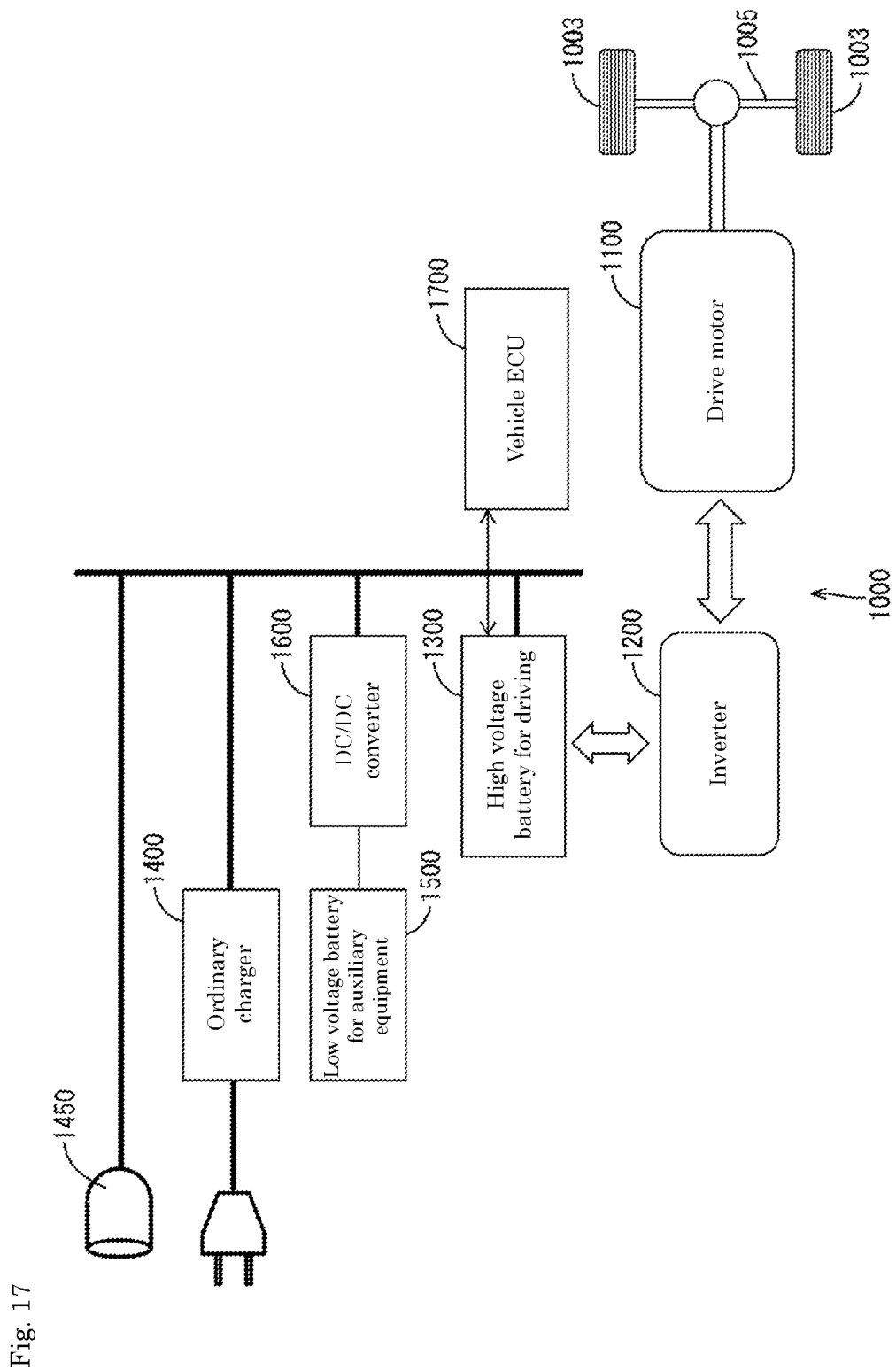
FIG. 17 is a block diagram of an electric vehicle according to an embodiment 8.

FIG. 17 is a block diagram of an electric vehicle. The electric vehicle 1000 includes: an axle 1005 with wheels 1003 fixed on both sides; a drive motor 1100; an inverter 1200; a high-voltage battery 1300 for driving; an in-vehicle ordinary charger 1400 that can be charged from a commercial power source; and a connector 1450 which is connectable to a quick charger (not shown in the drawing).

The high-voltage battery 1300 for driving can be charged by the quick charger or the in-vehicle ordinary charger 1400. The high-voltage battery 1300 for driving is connected to the driving motor 1100 via the inverter 1200. The inverter 1200 converts power of the high-voltage battery 1300 for driving from a direct current to an alternating current, and supplies the power to the drive motor 1200. The electric vehicle 1000 travels by driving the drive motor 120. A capacitor 1250 is connected in parallel to the inverter 1200 (see FIG. 18). The capacitor 1250 discharges to supplement an output of the high-voltage battery 1300 when an instantaneous output is required such as during rapid acceleration.

The electric vehicle 1000 includes a low voltage battery 1500 and a DC/DC converter 1600. The low voltage battery 1500 is a power source for in-vehicle auxiliary equipment.

Figure 18:
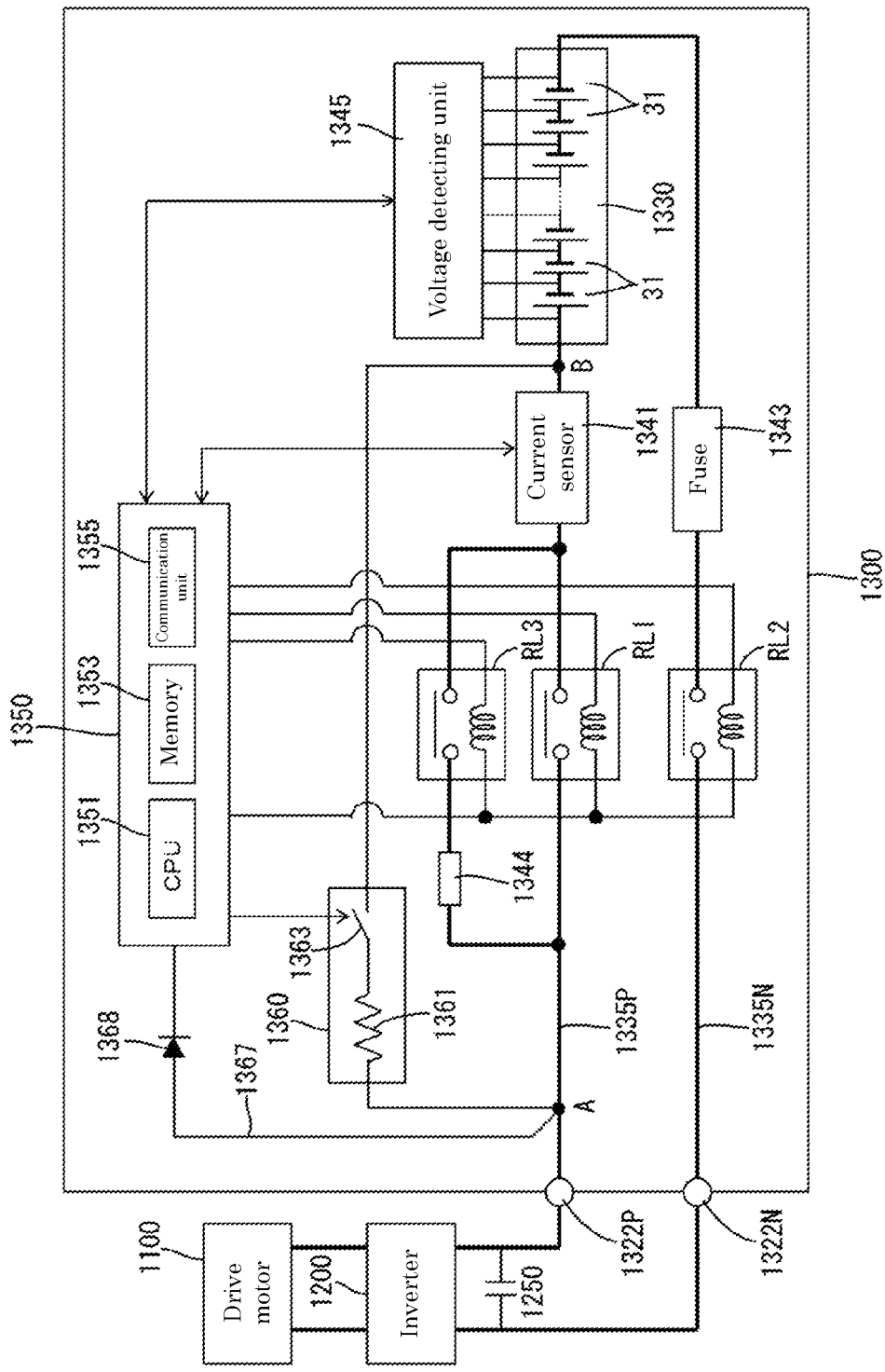
FIG. 18 is a block diagram showing an electrical configuration of a high-voltage battery for driving.

FIG. 18 is a block diagram of the high-voltage battery 1300 for driving. The high-voltage battery 1300 for driving includes: an external terminal 1322P on the positive electrode side; an external terminal 1322N on the negative electrode side; an assembled battery 1330; a current sensor 1341; a fuse 1343; a first relay RL1; a second relay RL2; a third relay RL3; and a resistor 1344.

The external terminal 1322P on the positive electrode side is connected to a positive electrode of the assembled battery 1330 via a current path 1335P on the positive electrode side. Further, the external terminal 1322N on the negative electrode side is connected to a negative electrode of the assembled battery 1330 through a current path 1335N on the negative electrode side. The first relay RL1 and the current sensor 1341 are disposed on a current path 1335P on the positive electrode side. The second relay RL2 and the fuse 1343 are disposed on a current path 1335N on the negative electrode side. The third relay RL3 is connected in parallel with the first relay RL1. The resistor 1344 is connected in series with the third relay RL3. The third relay RL3 is a charging path for charging the capacitor 1250, and the resistor 1344 is provided to limit a charge current of the capacitor 1250.

The high-voltage battery 1300 for driving includes: a voltage detecting unit 1345; a voltage applying circuit 1360; and a control device 1350 that controls the assembled battery 1330. The voltage detecting unit 1345 detects voltages V of respective secondary batteries 31 of the assembled battery 1330 and a total voltage Ev of the assembled battery 1330.

Similarly to the voltage applying circuit 60, the voltage applying circuit 1360 is a circuit that applies a voltage to the external terminal 1322P on the positive electrode side using the assembled battery 1330 as a power source. The voltage applying circuit 1360 includes a current limiting resistor 1361 and a switch 1363. The voltage applying circuit 1360 connects between a point A positioned between the external terminal 1322P on the positive electrode side and the first relay RL1 and a point B positioned between the current sensor 1341 and the positive electrode of the assembled battery 30.

The control device 1350 includes a CPU 1351 having an arithmetic function, a memory 1353 storing various information, a communication unit 1355, and the like. The communication unit 1355 is provided for communication between the control device 1350 and a vehicle electronic control unit (ECU) 1700 mounted on the electric vehicle 1000. The control device 1350 is connected to the point A via a signal line 1367, and can detect a voltage at the point A (a voltage at the external terminal 1322P on the positive electrode side). A diode 1368 may be disposed on the signal line 1367. A voltage at the point A can be stepped down by the diode 1368 and can be inputted to the control device 1350.

The control device 1350 can obtain information relating to a state of the electric vehicle 100 via communication with the vehicle ECU 1700. The information relating to a state of the electric vehicle 1000 includes parking, start of traveling, traveling, stop of traveling and the like.

The control device 1350 controls the relays RL1, RL2, and RL3 between an OPEN state and a CLOSE state in response to a state of the electric vehicle 1000 by sending control signals to the first relay RL1, the second relay RL2, and the third relay RL3 respectively.

When the electric vehicle 1000 is parked, the control device 1350 brings all of the first relay RL1, the second relay RL2, and the third relay RL3 into an OPEN state. As a result, except for a period where the high-voltage battery 1300 for driving is charged, the high-voltage battery 1300 for driving is disconnected from the inverter 1200 and the capacitor 1250 and the current is cut off during parking. When the control device 1350 receives information on the start of traveling from the vehicle ECU 1700, the control device 1350 performs the resetting control shown in FIG. 6. In the resetting control, the control device 1350 turns on the switch 1363 of the voltage applying circuit 1360 and applies a voltage to the external terminal 1322P on the positive electrode side. The control device 1350 detects a voltage at the point A after applying a voltage (S110). The control device 1350 compares a detected voltage at the point A with a threshold value, and determines whether or not a short-circuiting object that short-circuits the external terminal 1322P on the positive electrode side and the external terminal 1322N on the negative electrode side is present (S130).

When the control device 1350 determines that a short-circuiting object is not present (S130: YES), the control device 1350 sends a control signal to the third relay RL3 and the second relay RL2, and switches the third relay RL3 and the second relay RL2 from an OPEN state to a CLOSE state (S140).

By performing switching between the third relay RL3 and the second relay RL2, the high-voltage battery 1300 for driving is connected to the inverter 1200 and the capacitor 1250. After switching the relays, a current flows from the high-voltage battery 130 for driving through the third relay RL3 and the resistor 1344, and charges the capacitor 1250.

When charging of the capacitor 1250 is completed, the control device 1350 sends a control signal to the third relay RL3 and the first relay RL1, switches the third relay RL3 from a CLOSE state to an OPEN state and switches the first relay RL1 from an OPEN state to a CLOSE state.

By switching of the relay, after the capacitor 1250 is charged, it is possible to make a current flow from the high-voltage battery 130 for driving to the inverter 1200 via the path of the first relay RL1 so that the driving motor 1100 can be driven.

On the other hand, when the control device 50 determines that a short-circuiting object is present (S130: NO), the control device 1350 maintains all of the first relay RL1, the second relay RL2, and the third relay RL3 in an OPEN state (S150). By maintaining the first relay RL1, the second relay RL2, and the third relay RL3 in an OPEN state, it is possible to prevent a large current from flowing into the battery 20.

The control device 1350 switches the third relay RL3 and the second relay RL2 from an OPEN state to a CLOSE state only when the control device 1350 determines that a short-circuiting object is not present. Accordingly, it is possible to prevent a large current from flowing into the high-voltage battery 1300 for driving when the third relay RL3 and the second relay RL2 are switched to a CLOSE state.

Other Embodiments

The present invention is not limited to the embodiments described with reference to the above description and drawings. For example, the following embodiments are also included in the technical scope of the present invention.

(1) In the embodiments 1 to 8, a lithium ion secondary battery is illustrated as an example of an energy storage device. The energy storage device may be other secondary batteries, or an electric double layer capacitor or the like. Applications of the batteries 20, 120, 220, 320, 720, and 1300 are not limited to vehicles, and these batteries may be used in other applications such as an uninterruptible power system (UPS) and a battery of a solar power generation system. In addition, batteries that are float-charged or trickle-charged are always maintained close to a full charged state and hence, there exists a drawback that when a current cut-off device is switched from an OPEN state to a CLOSE state in a state where two external terminals are short-circuited to each other, a large current flows. By applying the technique to a battery that is float-charged or a battery that is trickle-charged, when the current cut-off device is switched from an OPEN state to a CLOSE state in a state where two external terminals are short-circuited to each other, the drawback that a large current easily flows can be overcome. The battery that is float-charged is, for example, a battery for vehicle auxiliary equipment. The battery that is trickle-charged is, for example, a UPS battery.

(2) In the embodiments 1, 2, 4, and 5, a resistor having a fixed resistance value is exemplified as an example of the current limiting element. Besides such a resistor, for example, it may be possible to use a variable resistor which has a positive temperature coefficient and has a higher resistance value as a temperature is increased. In the case where the variable resistor is used, when the external terminals are short-circuited to each other, a current flows into the variable resistor when a switch is turned off. As a result, the variable resistor generates heat and a resistance value of the variable resistor is increased and hence, a current flowing into the voltage applying circuit 60 can be limited.

Figure 19:
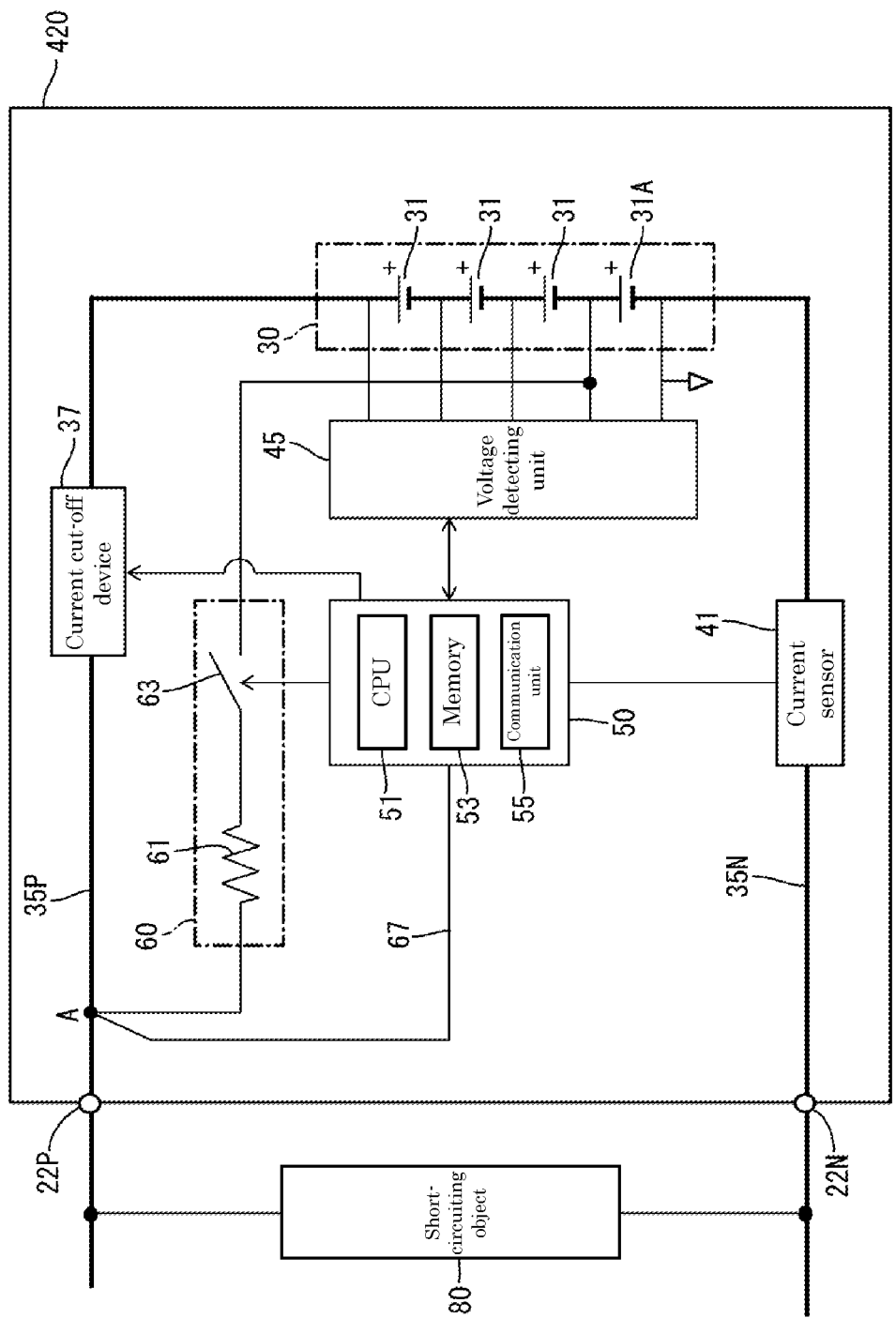
FIG. 19 is a block diagram showing an electrical configuration of a battery according to another embodiment.
Figure 20:
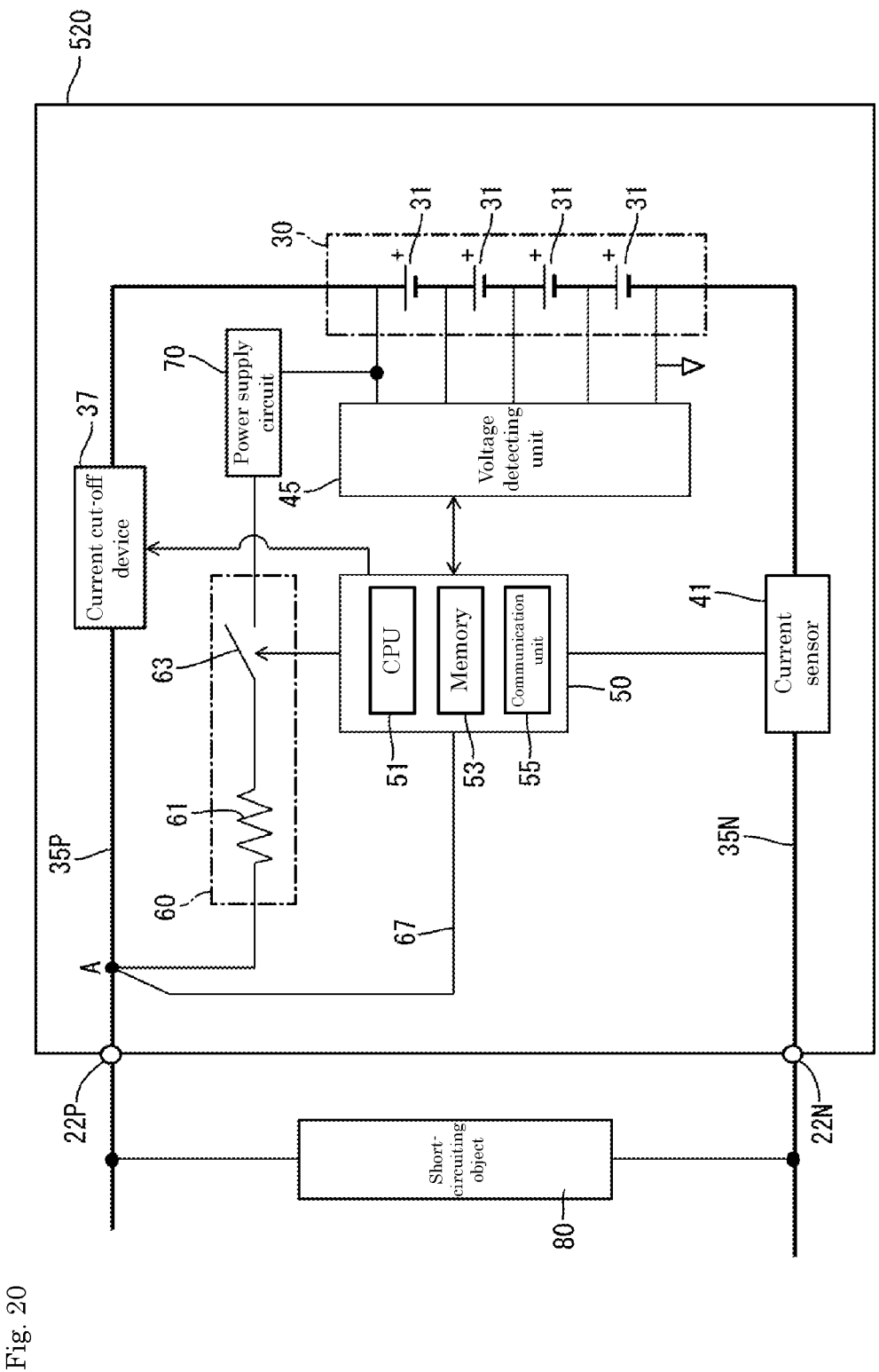
FIG. 20 is a block diagram showing an electrical configuration of a battery according to another embodiment.
Figure 21:
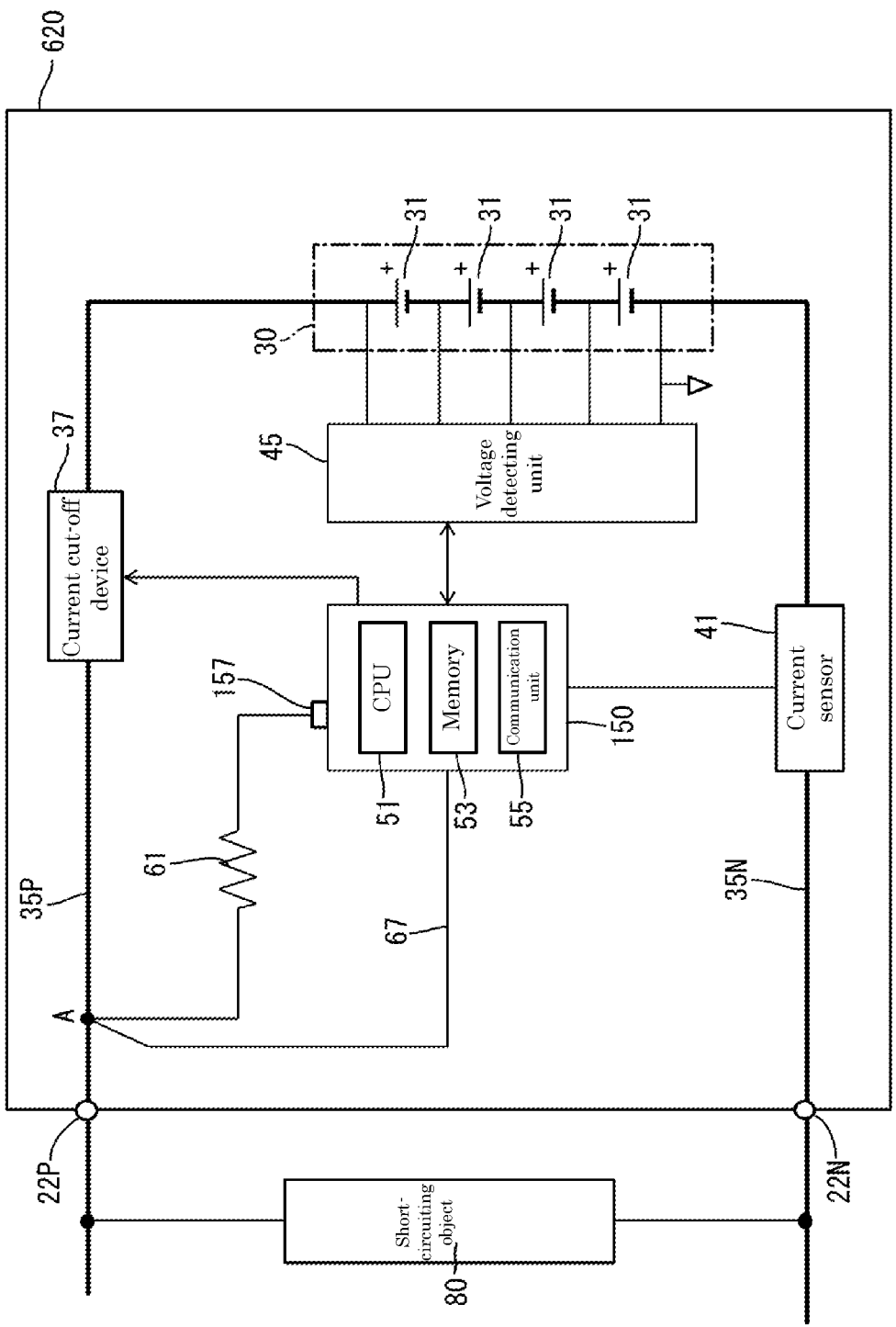
FIG. 21 is a block diagram showing an electrical configuration of a battery according to another embodiment.

(3) In the embodiment 1, the configuration is exemplified where the voltage applying circuit 60 connects between the point A on the side of the external terminal 22P on the positive electrode side and the point B on the positive electrode side of the assembled battery 30, and a voltage is applied to the external terminal 22P on the positive electrode side by using the assembled battery 30 as a power source. It is not always necessary that the power source of the voltage applying circuit 60 is the assembled battery 30, and the power source may be some of the secondary batteries 31A which form the assembled battery 30 as in the case of a battery 420 shown in FIG. 19. Further, the power source of the voltage applying circuit 60 may be a power supply circuit 70 disposed separately from the assembled battery 30 as in the case of a battery 520 shown in FIG. 20. The battery 520 is configured such that a voltage is applied to the external terminal 22P on the positive electrode side via the voltage applying circuit 60 using the power supply circuit 70 as a power source. As shown in FIG. 21, a battery 620 may be configured such that a control device 150 is used as a power source, and a voltage is applied from an output port 157 of the control device 150 to an external terminal 22P on the positive electrode side via a current limiting resistor 61 which forms a voltage applying circuit. The output port 157 is a port from which a voltage of a predetermined level is outputted. The control device 150 may set the output port 157 as a non-output port by an internal switch except when a voltage at the point A is detected. The power supply circuit 70 shown in FIG. 20 and the control device 150 shown in FIG. 21 correspond to the "another circuit" of the present invention.

(4) In the embodiment 6, in the resetting control, when the control device 50 determines that the external terminals 22P and 22N of the battery 20 are not short-circuited to each other, the control device 50 decides whether or not the current cut-off device 37 is to be switched from an OPEN state to a CLOSE state by comparing an SOC of the battery 20 with a predetermined value (FIG. 14: S135). The determination as to whether or not the switching processing is to be executed can be made based on not only an SOC but also on the information correlated with the SOC. For example, a voltage V of the secondary battery 31 and a charge-discharge time T of the battery 20 are correlated with an SOC. Therefore, whether or not the switching processing is to be executed may be decided by comparing a voltage V of the secondary battery 31 or a charge-discharge time T of the battery 20 with a predetermined value.

Figure 22:
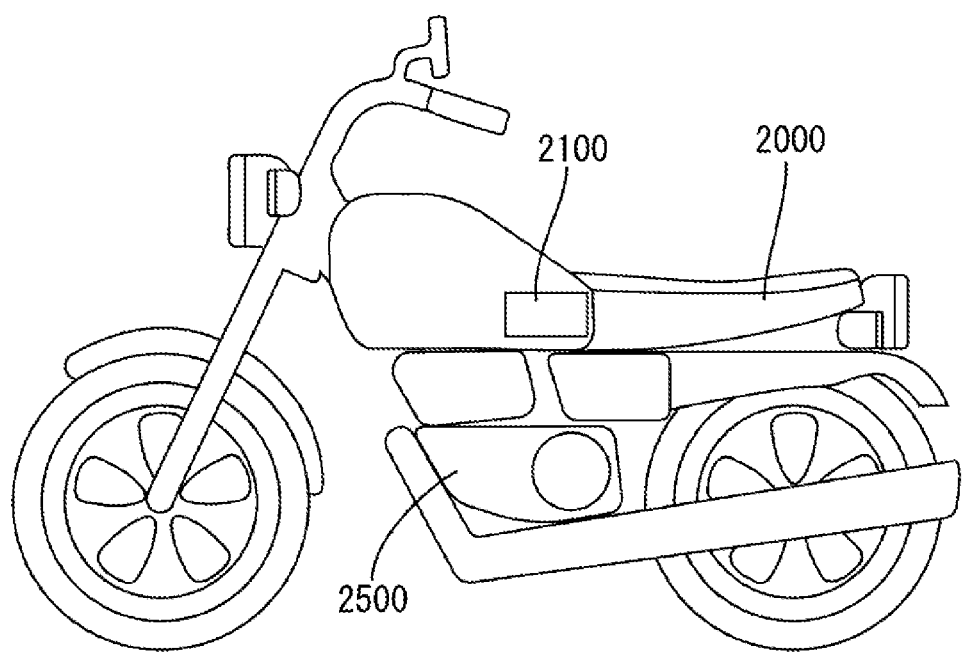
FIG. 22 is a side view of a motorcycle according to another embodiment.
Figure 23:
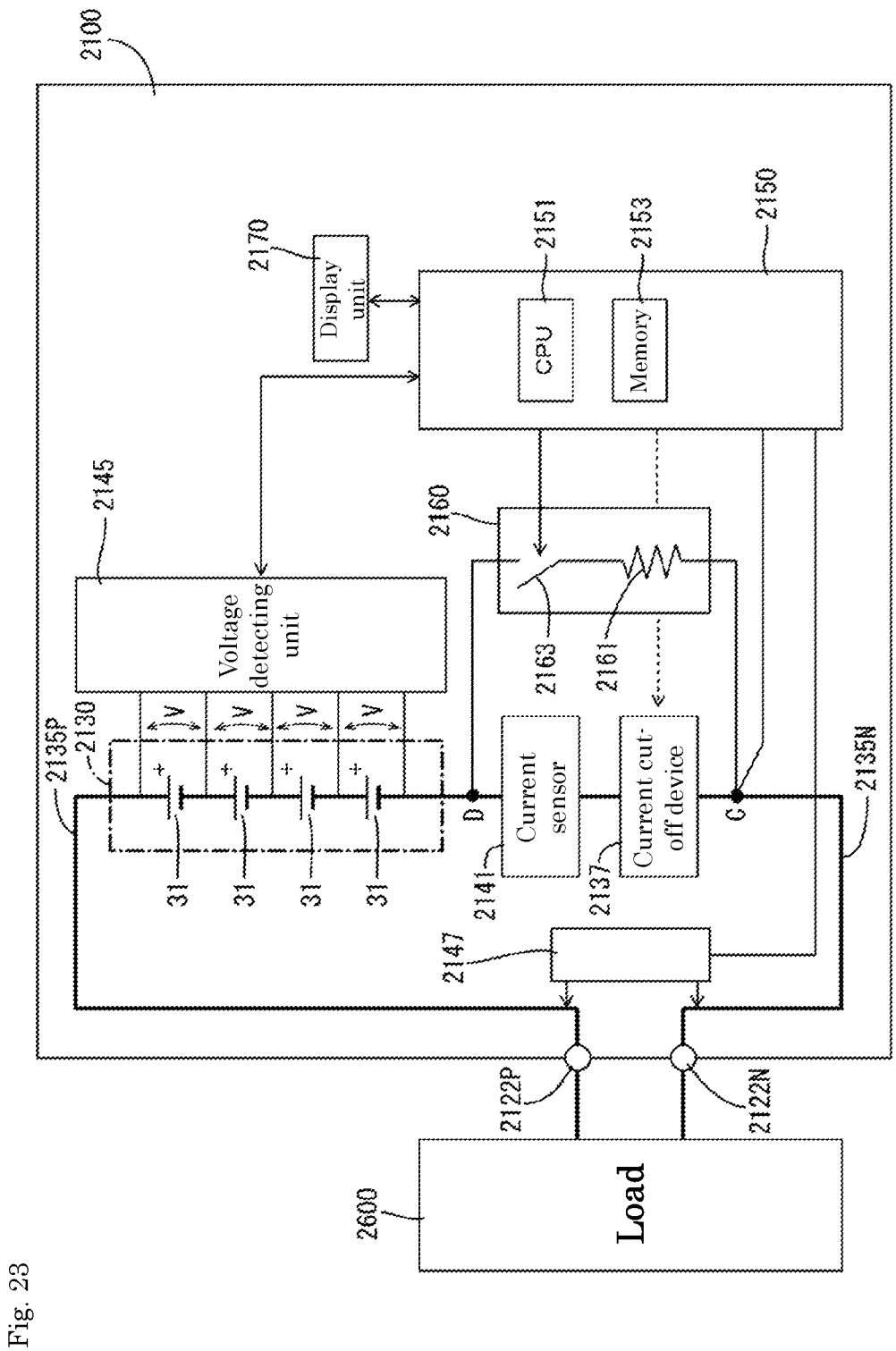
FIG. 23 is a block diagram showing an electrical configuration of a battery.

(5) In the embodiment 1, an example in which the technique is applied to the automobile 1 is shown. The technique may be applied to a motorcycle (an example of a vehicle). FIG. 22 is a side view of a motorcycle 2000 equipped with a battery 2100. FIG. 23 is a block diagram showing an electrical configuration of the battery 2100. The battery 2100 includes an external terminal 2122P on the positive electrode side and an external terminal 2122N on the negative electrode side. A load 2600 is connected to the battery 2100 via the external terminals 2122P and 2122N. The load 2600 is a cell motor or auxiliary equipment for driving an engine 2500 of the motorcycle 2000. The battery 2100 includes an assembled battery 2130, a current cut-off device 2137, and a current sensor 2141. The positive electrode of the assembled battery 2130 is connected to the external terminal 2122P on the positive electrode side via a current path 2135P on the positive electrode side. The negative electrode of the assembled battery 2130 is connected to the external terminal 2122N on the negative electrode side via a current path 2135N on the negative electrode side. The current sensor 2141 and the current cut-off device 2137 are disposed on the current path 2135N on the negative electrode side. The battery 2100 further includes a voltage detecting unit 2145, a voltage detecting unit 2147, a voltage applying circuit 2160, a control device 2150 that controls the assembled battery 2130, and a display unit 2170. The voltage detecting unit 2145 detects voltages V of respective secondary batteries 31 and a total voltage Ev of the assembled battery 20. The voltage detecting unit 2147 detects a voltage difference between two external terminals 2122P and 2122N. The voltage applying circuit 2160 includes a current limiting resistor 2161 and a switch 2163. The voltage applying circuit 2160 connects between a point C positioned between the external terminal 2122N on the negative electrode side and the current cut-off device 2137 and a point D positioned between the current sensor 2141 and the negative electrode of the assembled battery 2130.

The control device 2150 includes a CPU 2151 and a memory 2153. When the control device 2150 detects short-circuiting between two external terminals 2122P and 2122N, the control device 2150 brings the current cut-off device 2137 into an OPEN state and cuts off a current. By cutting off the current, a damage to the battery 2100 can be prevented. The control device 2150 also applies a voltage to the external terminal 2122P on the negative electrode side using the voltage applying circuit 2160 during a period in which the current cut-off device 2137 is in an OPEN state. The control device 2150 detects a voltage of the external terminal 2122N on the negative electrode side (the voltage at the point C) and determines the presence or the non-presence of a short-circuiting object which causes short-circuiting between two external terminals 2122P and 2122N by comparing the detected voltage with a threshold value. When the control device 1350 determines that the short-circuiting object is not present, the control device 1350 switches the current cut-off device 2137 from an OPEN state to a CLOSE state. As a result, the battery 2100 can be reused.

The motorcycle 2000 has a smaller arrangement space for the battery 2100 than the automobile and hence, there is a concern that a cable or wiring disconnected from equipment may cause short-circuiting between two external terminals 2122P and 2122N. When the motorcycle 2000 falls while traveling, there are few things that cover the wiring or the like compared to the automobile. Accordingly, it is considered that short-circuiting is likely to occur due to a damage to the wiring or the like. By applying the technique to the motorcycle 2000, a damage to the battery 2100 can be prevented even when two external terminals 2122P and 2122N are short-circuited. When a short-circuiting object is removed, the control device 1350 switches the current cut-off device 2137 from a CLOSE state to an OPEN state and hence, the battery 2100 can be reused even when a user does not perform any special work or operation.

(6) In the embodiment 8, the example where the technique is applied to the electric vehicle 1000 has been described. However, the technique may be applied to a hybrid vehicle having a drive motor and an engine.

DESCRIPTION OF REFERENCE SIGNS

20 . . . battery (an example of "energy storage apparatus")
22P, 22N . . . external terminal on positive electrode side, external terminal on negative electrode side
30 . . . assembled battery
31 . . . secondary battery (an example of "energy storage device")
35P, 35N . . . current path
37 . . . current cut-off device
41 . . . current sensor
50 . . . control device
60 . . . voltage applying circuit
61 . . . current limiting resistor (example of "current limiting element")
63 . . . switch

The invention claimed is:

1. An energy storage apparatus, comprising:
 a case;
 an energy storage device accommodated in the case;
 an external terminal connected to the energy storage device and disposed on the case;
 a current cut-off device disposed on a current path connecting the energy storage device and the external terminal to each other;

a voltage applying circuit that is provided in the case and applies a voltage to the external terminal using the energy storage device as a power source; and a control device, wherein the energy storage device includes a lithium ion secondary battery, wherein the voltage applying circuit connects the power source and the external terminal to each other, the voltage applying circuit including a current limiting element or a capacitor and a switch connected in series, and wherein the control device is configured to perform:
  a current cut-off processing for cutting off flowing of a current into the energy storage device by bringing the current cut-off device into an OPEN state;
  a detecting processing for detecting a voltage of the external terminal to which a voltage is applied by the voltage applying circuit during a period in which the flowing of the current is cut off by the current cut-off processing;
  a determining processing for determining a presence or a non-presence of a short-circuiting object which causes short-circuiting between the external terminal and an other external terminal of the energy storage apparatus based on a voltage of the external terminal detected in the detecting processing; and
  a switching processing for switching the current cut-off device to a CLOSE state only when it is determined that the short-circuiting object is not present in the determining processing.

2. The energy storage apparatus according to claim 1, wherein the control device performs the current cut-off processing when the external terminal is short-circuited.

3. The energy storage apparatus according to claim 1, wherein the control device is further configured to decide whether or not to execute the switching processing based on information related to a state of charge of the energy storage device when the control device determines that the short-circuiting object is not present in the determining processing.

4. A vehicle, comprising:
  a drive motor that drives an axle; and
  the energy storage apparatus according to claim 1 that supplies electric power to the drive motor.

5. A motorcycle comprising the energy storage apparatus according to claim 1.

6. The energy storage apparatus according to claim 1, wherein the voltage applying circuit includes die current limiting element and the switch connected in series.

7. The energy storage apparatus according to claim 1, wherein the voltage applying circuit includes the capacitor and the switch connected in series.

8. The energy storage apparatus according to claim 7, wherein the capacitor is coupled to the external terminal and the switch.

9. The energy storage apparatus according to claim 8, wherein the capacitor is directly connected to the external terminal.

10. The energy storage apparatus according to claim 1, further comprising:
  a positioning member that positions the energy storage device, a bottom surface of the positioning member facing the energy storage device and an upper surface of the positioning member facing the external terminal and including bus bars connected to the energy storage device.

11. The energy storage apparatus according to claim 10, further comprising:
  an inner lid disposed above the positioning member to cover the bus bars, the external terminal and the control device being disposed on an upper surface of the inner lid.

12. The energy storage apparatus according to claim 11, further comprising:
  an upper lid disposed above the inner lid to cover an opening of the case.

13. The energy storage apparatus according to claim 1, further comprising:
  a current sensor disposed between the other external terminal and the energy storage device to detect a current flowing into the energy storage device,
  wherein the external terminal, the current cut-off device, the energy storage device, the current sensor, and the other external terminal are in order connected in series.

14. An energy storage apparatus, comprising:
  a case;
  an energy storage device accommodated in the case;
  an external terminal and an other external terminal each connected to the energy storage device and disposed on the case;
  a current cut-off device disposed on a current path connecting the energy storage device and the external terminal to each other;
  a voltage applying circuit that is provided in the case and applies a voltage to the external terminal using the energy storage device; and
  a control device,
  wherein the energy storage device includes a lithium ion secondary battery,
  wherein the voltage applying circuit connects the power source and the external terminal to each other, and
  wherein the control device is configured to:
    cut off flowing of a current into the energy storage device by bringing the current cut-off device into an OPEN state;
    detect a voltage of the external terminal to which a voltage is applied by the voltage applying circuit during a period in which the flowing of the current is cut off by the current cut-off processing; and
    switch the current cut-off device to a CLOSE state only when it is determined that a short-circuiting object, which causes short-circuiting between the external terminal and the other external terminal based on a voltage of the external terminal detected in the detecting processing, is absent.

15. The energy storage apparatus according to claim 14, wherein the voltage applying circuit includes a current limiting element and a switch connected in series.

16. The energy storage apparatus according to claim 14, wherein the voltage applying circuit includes a capacitor and a switch connected in series.

17. The energy storage apparatus according to claim 16, wherein the capacitor is coupled to the external terminal and the switch such that the capacitor is directly connected to the external terminal.

18. The energy storage apparatus according to claim 14, further comprising:
  a positioning member that positions the energy storage device, a bottom surface of the positioning member facing the energy storage device and an upper surface of the positioning member facing the external terminal and including bus bars connected to the energy storage device.

19. The energy storage apparatus according to claim 18, further comprising:
- an inner lid disposed above the positioning member to cover the bus bars, the external terminal and the control device being disposed on an upper surface of the inner lid; and
- an upper lid disposed above the inner lid to cover an opening of the case.

20. The energy storage apparatus according to claim 19, further comprising:
- a current sensor disposed between the other external terminal and the energy storage device to detect a current flowing into the energy storage device,
- wherein the external terminal, the current cut-off device, the energy storage device, the current sensor, and the other external terminal are in order connected in series.

* * * * *